US012388529B2

(12) United States Patent
Mertz et al.

(10) Patent No.: US 12,388,529 B2
(45) Date of Patent: Aug. 12, 2025

(54) STATE OF POLARIZATION SENSITIVE COHERENT OPTICAL TIME DOMAIN REFLECTOMETRY

(71) Applicant: Infinera Corp., Sunnyvale, CA (US)

(72) Inventors: Pierre Mertz, Baltimore, MD (US); Han Henry Sun, Ottawa (CA); Robert Maher, San Francisco, CA (US)

(73) Assignee: Infinera Corp., Sunnyvale, CA (US)

( * ) Notice: Subject to any disclaimer, the term of this patent is extended or adjusted under 35 U.S.C. 154(b) by 455 days.

(21) Appl. No.: 17/699,915

(22) Filed: Mar. 21, 2022

(65) Prior Publication Data
US 2022/0303014 A1 Sep. 22, 2022

Related U.S. Application Data

(60) Provisional application No. 63/163,462, filed on Mar. 19, 2021.

(51) Int. Cl.
H04B 10/40 (2013.01)
H04B 10/532 (2013.01)
H04B 10/61 (2013.01)

(52) U.S. Cl.
CPC ........... H04B 10/40 (2013.01); H04B 10/532 (2013.01); H04B 10/614 (2013.01)

(58) Field of Classification Search
CPC ..... H04B 10/40; H04B 10/532; H04B 10/614
See application file for complete search history.

(56) References Cited

U.S. PATENT DOCUMENTS

| 7,346,279 B1* | 3/2008 | Li ................. H04B 10/40 398/32 |
| 10,211,917 B1* | 2/2019 | Wang .............. H04B 10/032 |
| 10,411,796 B1* | 9/2019 | Archambault ..... G01M 11/3163 |
| 2009/0232518 A1* | 9/2009 | Caton .............. H04B 10/58 398/193 |
| 2015/0333860 A1* | 11/2015 | Rahn .............. H04L 27/0008 398/34 |
| 2017/0033870 A1* | 2/2017 | Dangui ............ H04J 14/0279 |
| 2021/0021338 A1* | 1/2021 | Calabrò .......... H04B 10/07953 |
| 2021/0159983 A1* | 5/2021 | Morsy-Osman ..... H04B 10/40 |
| 2023/0216587 A1* | 7/2023 | Ghannouchi ..... H04B 10/25754 398/116 |

* cited by examiner

Primary Examiner — Pranesh K Barua

(57) ABSTRACT

A transceiver is herein described. The transceiver comprises an optical source providing an optical signal, a modulator receiving the optical signal and configured to encode data into the optical signal, a transmitter module to receive data to be encoded into the optical signal and having at least one drive circuit supplying driver signals to the modulator to cause the modulator to encode data into a carrier having a frequency band and a tone signal outside of the frequency band into the optical signal, a narrowband filter operable to receive a portion of the optical signal via an optical loopback, the optical signal having the encoded data and a first tone reflection of the tone signal at a first instant of time and to pass the first tone reflection, a polarimeter operable to receive the first tone reflection and determine a first tone polarization of the first tone reflection.

10 Claims, 12 Drawing Sheets

STATE OF POLARIZATION SENSITIVE COHERENT OPTICAL TIME DOMAIN REFLECTOMETRY

CROSS REFERENCE TO RELATED APPLICATIONS

This application claims the benefit of U.S. Provisional Patent Application No. 63/163,462, filed Mar. 19, 2021, which is incorporated herein by reference in its entirety.

BACKGROUND

Optical communication systems typically include a first node that outputs optical carriers to one or more second nodes. The first and second nodes are connected to each other by one or more segments of optical fiber. At the first node, optical signals, each having a corresponding wavelength, and each being modulated to carry a different data stream, are multiplexed onto the optical fiber. In such systems, a laser and a modulator may be provided to generate each optical signal. Additionally, optical communication systems may include high-speed circuitry and components to generate high-speed optical signals at a transmit end (e.g., first node) of the system. At a receive end (e.g., second node), corresponding high-speed circuitry may be provided to detect the incoming data and to forward or distribute such data to lower capacity nodes.

In subsea optical communication systems, one or more optical amplifier, such as an in-line optical amplifier, may be positioned at specific geographic locations between the first node and the second node along the one or more segments of optical fiber.

From time to time, environmental disturbances may occur at one or more location between the first node and the second node and along the one or more segments of fiber. Rapidly identifying the location of these environmental disturbances is desired. Prior methods of identifying a location of environmental disturbances, such as providing a sensor network along the optical communication system, are costly, time consuming, and would require additional maintenance.

Thus, a need exists to identify the location of environmental disturbances using currently deployed subsea optical communication equipment without impacting any data stream multiplexed onto the optical fiber. It is to such a system and method that the present disclosure is directed.

SUMMARY

Consistent with the present disclosure, a system is provided in which a transceiver comprises an optical source, a modulator, a transmitter module, a narrowband filter, a polarimeter, and an optical loopback. The optical source has a laser operable to provide a continuous wave optical signal. The modulator receives the continuous wave optical signal from the optical source. The modulator is further configured to encode data into the continuous wave optical signal based on one or more driver signals. The transmitter module has circuitry to receive data to be encoded into the continuous wave optical signal and at least one drive circuit supplying driver signals to the modulator to cause the modulator to encode data into a carrier having a frequency band and a tone signal outside of the frequency band into the continuous wave optical signal. The continuous wave optical signal has an optical power and a polarization. The narrowband filter is operable to receive a portion of the continuous wave optical signal having the encoded data and a first tone reflection of the tone signal at a first instant of time and to pass the first tone reflection of the continuous wave optical signal at the first instant of time. The polarimeter is operable to receive the first tone reflection and determine a first tone polarization of the first tone reflection. The optical loopback component is operable to direct the portion of the continuous wave optical signal to the narrowband filter.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DESCRIPTION OF THE EMBODIMENTS

Figure 1:
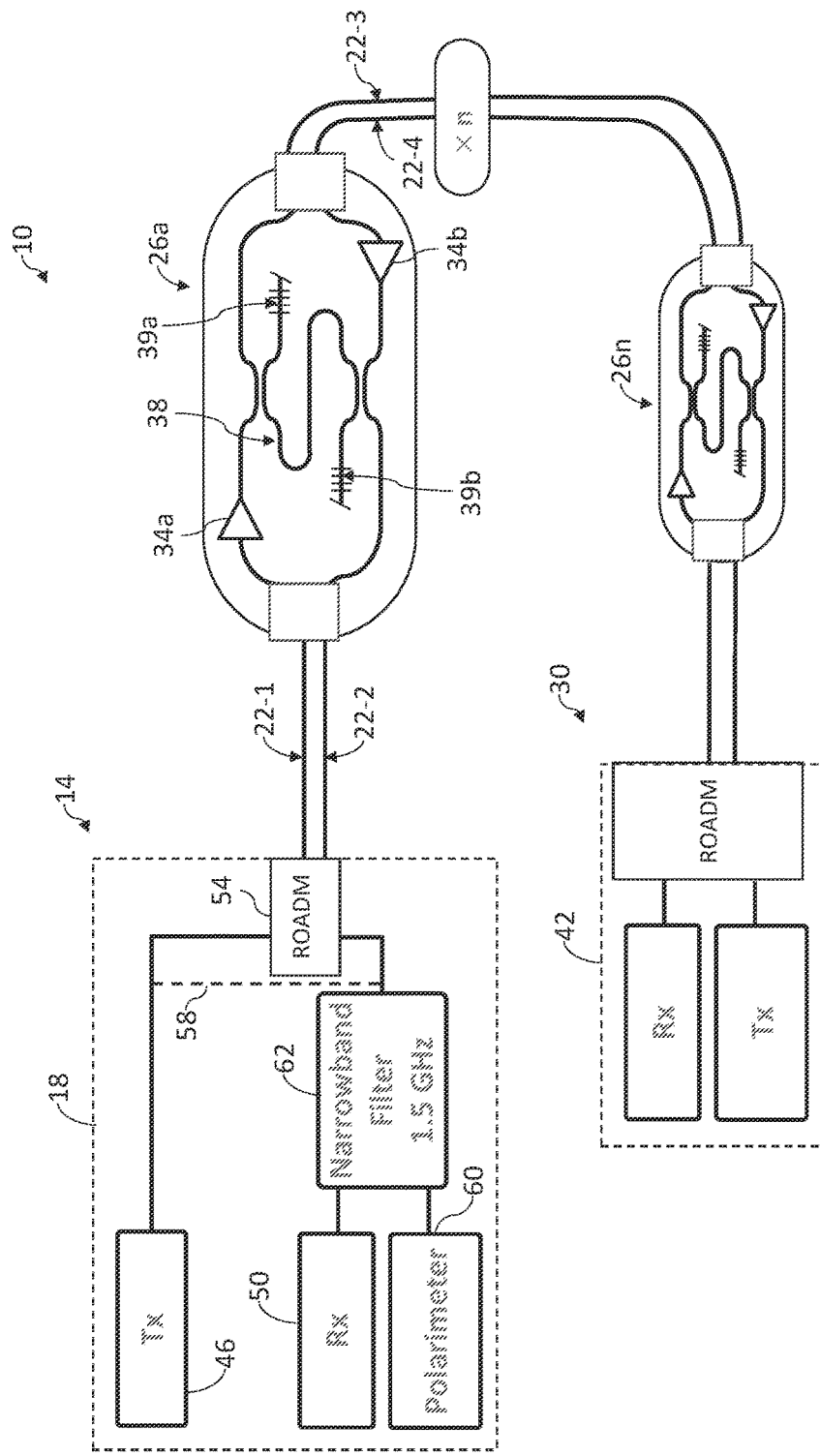
FIG. 1 is a block diagram showing an exemplary embodiment of an optical network constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like.

The methods and systems herein disclosed may be used in optical networks. In one embodiment, the optical network has one or more band, or portion of wavelength. As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An Optical Cross-Connect is a device for switching at least a portion of a spectrum of light in an optical signal received on an input optical port to any (one or more) output optical port. An optical cross-connect can be configured on ROADM network elements, with a built-in wavelength selective switch (WSS) component that is used to route an optical signal in any of the fiber degrees or directions. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

As used herein, a span, or link, is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated. For example, the fiber optic cable may not be terminated at an optical in-line amplifier (described in detail below).

The terms "hub," "hub node," and "primary node" are used interchangeably herein. In addition, the terms "leaf," "leaf node," and "secondary node" are used interchangeably herein.

Referring now to the drawings, and in particular to FIG. 1, an exemplary embodiment of optical communication system 10 is illustrated therein. The optical communication system 10 includes, for example, a primary node 14. The primary node 14 includes a primary transceiver or transceiver module 18, for example, that supplies a downstream optical signal DS having a tone signal (described in detail below) to optical fiber link 22-1, and receives an upstream signal having a tone reflection of the tone signal (described in detail below) from optical fiber link 22-2.

In one embodiment, each node may include a coherent optical time domain reflectometer (COTDR) to perform cable monitoring tests having a high accuracy and traditionally utilized to find optical fiber faults, such as a severed cable.

In one embodiment, the optical communication system 10 includes one or more in-line node 26a-n (referred to collectively as in-line node 26) between the primary node 14 and a secondary node 30. The in-line node 26 may, in part, boost signals in the optical fiber submarine cable 22. The in-line node 26 may be referred to as a "repeater" that receives, amplifies, and transmits the optical signals thereby increasing a transmission range of the optical signals. Not all optical communication systems 10 utilize in-line node(s) 26 and the present disclosure may apply to both repeater and repeaterless systems. In one embodiment, the in-line node 26 may be a repeater or an optical in-line amplifier.

In one embodiment, the in-line node 26 may include one or more amplifier 34 and a high loss loopback 38. An amplifier 34a may amplify the optical signal in the optical fiber link 22-1 before the optical signal continues downstream to the optical fiber link 22-3. Similarly, an amplifier 34b may amplify an incoming optical signal in an optical fiber link 22-4 before the incoming optical signal continues upstream along to the optical fiber link 22-2. In one embodiment, the amplifier 34 is an erbium doped optical amplifier.

In one embodiment, the high loss loopback 38 is a High Loss Loopback, or an optical coupler operable to be tuned to a particular wavelength and having a fiber bragg grating 39 to cause a portion of the optical signal at the tuned wavelength (e.g., the tone signal) to be inserted into the incoming optical signal in the upstream direction (e.g., the tone reflection). In this embodiment, the high loss loopback 38 includes two fiber bragg gratings identified with the reference numerals 39a and 39b. The fiber bragg grating 39a reflects a portion of the optical signal amplified by the amplifier 34a, to cause the portion of the optical signal to be inserted onto the optical fiber 22-2. The fiber bragg grating 39b reflects a portion of the optical signal amplified by the amplifier 34b, to cause the portion of the optical signal to be inserted onto the optical fiber 22-3.

In one embodiment, the secondary node 30 is constructed similar to and may have a structure similar to and operate in manner similar to that described above with respect to the primary node 14. In one example, however, a secondary transceiver 42 may supply a modulated optical signal in an upstream direction. Each optical signal may include one or more optical subcarrier. Collectively, a number the optical subcarriers output from the secondary transceiver 42 may be equal to, less than, or greater than the number of optical subcarriers output from primary transceiver 18.

The optical communication system 10 typically utilizes Wavelength Division Multiplexing (WDM) such as Dense Wavelength Division Multiplexing (DWDM). Dense Wavelength Division Multiplexing multiplexes multiple optical carrier signals onto a single optical fiber by using different laser light wavelengths.

In the optical communication system 10, one or more optical data carrier signals may be transmitted in one or more optical data channel (shown in FIG. 4, below) along with the tone signal through the optical fiber 22. In particular, selected subcarriers may be transmitted in the downstream direction from primary node 14 to the secondary node 30, and other subcarriers may be transmitted in the upstream direction from the secondary node 30 to the primary node 14.

In some implementations, the optical communication system 10 may include one or more additional primary node 14 and/or secondary node 30 and optical communication paths 22, fewer primary nodes 14 and/or secondary nodes 30 and optical communication paths 22, or may have a configuration different from that described above. For example, the optical communication system 10 may have a mesh configuration or a point-to-point configuration.

In one embodiment, the primary transceiver 18 generally comprises one or more transmitter module 46 and receiver module 50 optically coupled to a ROADM 54. The primary transceiver 18 may further include an optical loopback 58 operable to be tuned to a particular wavelength and cause a portion of the optical signal at the tuned wavelength (e.g., the tone signal) to be sent from the transmitter module 46 towards the receiver module 50 (e.g., as the tone reflection). In some embodiments, the primary transceiver 18 may further include a narrowband filter 62 optically disposed between the ROADM 54, or when present the optical loopback 58, and the receiver module 50. When the narrowband filter 62 is present, the primary transceiver 18 may further include a polarimeter 66 optically connected to the narrowband filter 62.

In some embodiments, when the narrowband filter 62 is present, the narrowband filter 62 is operable to filter a first portion of an optical signal corresponding to the tone signal and direct the tone reflection to the polarimeter 66.

In one embodiment, the narrowband filter 62 may be replaced with a wavelength selective switch (WSS) operable to receive the optical signal and direct the first portion of the optical signal corresponding to the tone signal and direct the tone reflection to the polarimeter 66 while directing the remainder of the optical signal to the receiver module 50.

In one embodiment, the primary node 14 may include a transmitter module 46 that supplies a downstream modulated optical signal including subcarriers and the tone signal, and a receiver module 50 that receives upstream subcarriers carrying data originating from the secondary node 30 and may include a tone reflection, as described below.

In one embodiment, the transmitter module 46 may include the tone signal into the downstream modulated optical signal at discrete intervals. For example, in one embodiment, the transmitter module 46 may include the tone signal into the downstream modulated optical signal at a frequency no greater than a time it would take an optical signal to travel from the primary node 14, to a last in-line node 36 (e.g., the in-line node 26n) and back to the primary node 14. In this way, the transmitter module 46 may ensure that a second tone signal sent in the downstream modulated optical signal does not cause a tone reflection that may interfere with one or more tone reflections from a first tone signal.

In some embodiments, if the tone signal has a narrow bandwidth, the tone signal may be inserted into the optical signal at greater frequencies. If the tone signal consists of coded pulses, then a quality of the decoded SOP can be improved.

In one embodiment, the transmitter module 46 may include a first tone signal into the downstream modulated optical signal at a first frequency and include a second tone signal into the downstream modulated optical signal at a second frequency such that the first frequency and the second frequency do not overlap one another. In this manner, the transmitter module 46 may transmit a second tone signal prior to receiving all tone reflections for the first tone signal.

In other embodiments, the transmitter module 46 in the primary node 14 may include a first tone signal into the downstream modulated optical signal at a first frequency and the transmitter module in the secondary node 30 may include a second tone signal into the upstream modulated optical signal at a second frequency such that the first frequency and the second frequency do not overlap one another. In this manner, the transmitter module 46 of the primary node 14 may transmit the first tone signal and received first tone reflections on the upstream modulated optical signal without interfering with the second tone signal on the upstream modulated optical signal and second tone reflections on the downstream modulated optical signal received by the secondary node 30.

Figure 2:
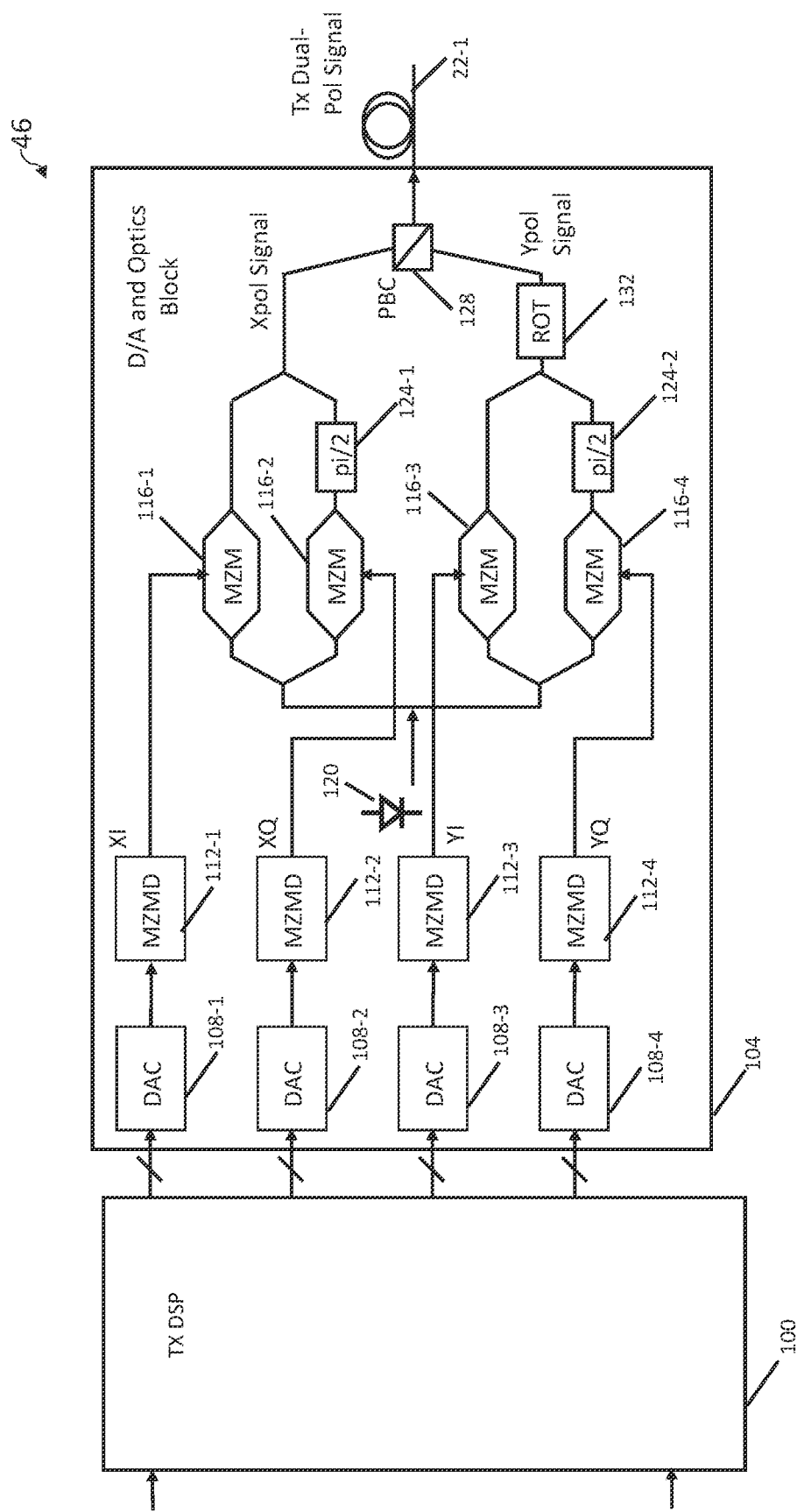
FIG. 2 is a block diagram showing an exemplary embodiment of a primary node transmitter constructed in accordance with the present disclosure.

Referring now to FIG. 2, shown therein is a diagram of an exemplary embodiment of the transmitter module 46 constructed in accordance with the present disclosure. The transmitter module 43 generally includes a transmitter DSP (TX DSP) 100 and a D/A and optics block 104. In one embodiment, each input to the DSP 100, such as the inputs to FEC encoders 1002 described below (see FIG. 3), receives user data.

In one embodiment, the DSP 100 may supply a plurality of outputs to D/A and optics block 104 including digital-to-analog conversion (DAC) circuits 108-1 to 108-4, which convert a digital signal received from the DSP 100 into corresponding analog signals. D/A and optics block 104 also includes driver circuits 112-1 to 112-2 that receive the analog signals from DACs 108-1 to 108-4 and adjust the voltages or other characteristics thereof to provide drive signals to a corresponding one of modulators 116-1 to 116-4

D/A and optics block 104 further includes modulators 116-1 to 116-4, each of which may be, for example, a Mach-Zehnder modulator (MZM) that modulates the phase and/or amplitude of the light output from laser 120. As further shown in FIG. 2, light output from laser 120 is split such that a first portion of the light is supplied to a first MZM pairing, including MZMs 116-1 and 116-2, and a second portion of the light is supplied to a second MZM pairing, including MZMs 116-3 and 116-4. The first portion of the light is split further into third and fourth portions, such that the third portion is modulated by MZM 116-1 to provide an in-phase (I) component of an X (or TE) polarization component of a modulated optical signal, and the fourth portion is modulated by MZM 116-2 and fed to phase shifter 124-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 116-3 to provide an I component of a Y (or TM) polarization component of the modulated optical signal, and the sixth portion is modulated by MZM 116-4 and fed to phase shifter 124-2 to shift the phase of such light by 90 degrees to provide a Q component of the Y polarization component of the modulated optical signal.

The optical outputs of MZMs 116-1 and 116-2 are combined to provide an X polarized optical signal including I and Q components and are fed to a polarization beam combiner (PBC) 128. In addition, the outputs of MZMs 116-3 and 116-4 are combined to provide an optical signal that is fed to polarization rotator 132, that rotates the polarization of such optical signal to provide a modulated optical signal having a Y (or TM) polarization. The Y polarized modulated optical signal also is provided to PBC 128, which combines the X and Y polarized modulated optical signals to provide a polarization multiplexed ("dual-pol") modulated optical signal onto optical fiber 22, for example optical fiber 22-1, which may be included as a segment of optical fiber in optical communication path 22.

The polarization multiplexed optical signal output from D/A and optics block 104 includes subcarriers SC0-SC8 noted described below, such that each subcarrier has X and Y polarization components and I and Q components. Moreover, the polarization multiplexed optical signal output from the D/A and optics block 104 may further include the tone signal having an initial polarization described in more detail below with respect to FIG. 4.

Figure 3:
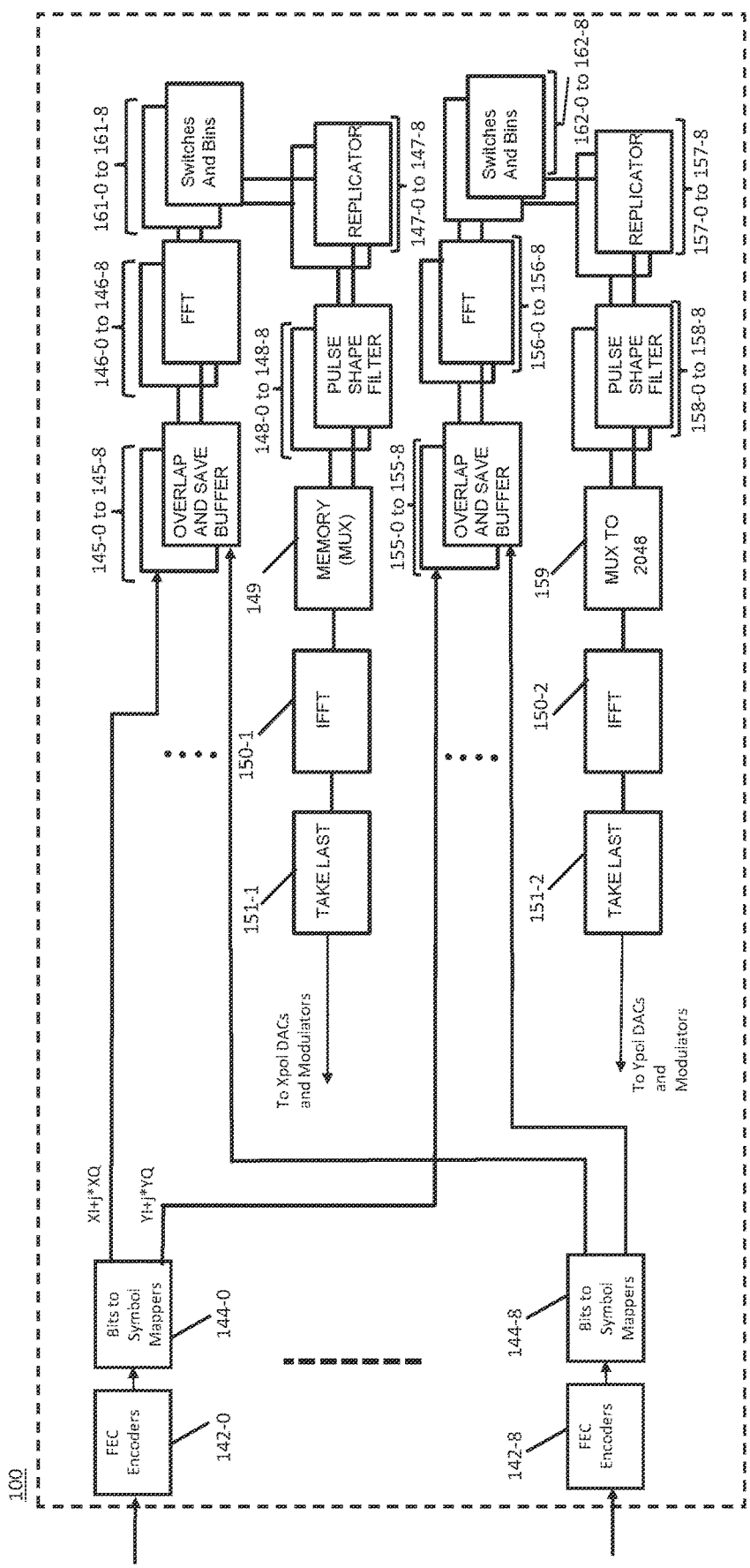
FIG. 3 is a block diagram showing an exemplary embodiment of a primary node transmitter digital signal processor (DSP) constructed in accordance with the present disclosure.

Referring now to FIG. 3, shown therein is a diagram of an exemplary embodiment of the DSP 100 of FIG. 2 shown in greater detail and constructed in accordance with the present disclosure. The TX DSP 100 may include FEC encoders 142-0 to 142-8. The FEC encoders 142-0 to 142-8 carry out forward error correction coding on a corresponding one of the switch outputs, such as, by adding parity bits to the received data. FEC encoders 142-0 to 142-8 may also provide timing skew between the subcarriers to correct for skew induced by link between nodes 14, 30. In addition, FEC encoders 142-0 to 142-8 may interleave the received data.

Each of FEC encoders 142-0 to 142-8 provides an output to a corresponding one of a plurality of bits-to-symbol circuits, 144-0 to 144-8 (collectively referred to herein as "144"). Each of bits-to-symbol circuits 144 may map the encoded bits to symbols on a complex plane. For example, bits-to-symbol circuits 144 may map four bits to a symbol in a dual-polarization QPSK constellation. Each of bits-to-symbol circuits 144 provides first symbols, having the complex representation XI+j*XQ, associated with a respective one of the switch outputs, such as D-0, to DSP portion 143. Data indicative of such first symbols is carried by the X polarization component of each subcarrier SC0-SC7.

Each of bits-to-symbol circuits 144 further may provide second symbols having the complex representation YI+j*YQ. Data indicative of such second symbols, however, is carried by the Y polarization component of each subcarrier SC-0 to SC-7.

Such mapping, as carried by about circuit 144-0 to 144-8 defines, in one example, a particular modulation format for each subcarrier. That is, such circuit may define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, 32, 64, 128 or 256, for example) format. In another example, one or more of the optical subcarriers may have a modulation format that is different than the modulation format of other optical subcarriers. That is, one of the optical subcarriers have a QPSK modulation format and another optical subcarrier has a different modulation format, such as 8-QAM or 16-QAM. In another example, one of the optical subcarriers has an 8-QAM modulation format and another optical subcarrier has a 16 QAM modulation format. Accordingly, although all the optical subcarriers may carry data at the same data and or baud rate, consistent with an aspect of the present disclosure one or more of the optical subcarriers may carry data at a different data or baud rate than one or more of the other optical subcarriers. Moreover, modulation formats, baud rates and data rates may be changed over time depending on capacity requirements, for example. Adjusting such parameters may be achieved, for example, by applying appropriate signals to mappers 144 based on control information or data described herein and the communication of such data as further disclosed herein between hub and leaf nodes.

As further shown in FIG. 3, each of the first symbols output from each of bits-to-symbol circuits 144 is supplied to a respective one of first overlap and save buffers 145-0 to 145-8 (collectively referred to herein as overlap and save buffers 145) that may buffer 256 symbols, for example. Each of overlap and save buffers 145 may receive 128 of the first symbols or another number of such symbols at a time from a corresponding one of bits to symbol circuits 144. Thus, overlap and save buffers 145 may combine 128 new symbols from bits to symbol circuits 145, with the previous 128 symbols received from bits to symbol circuits 145.

Each overlap and save buffer 145 supplies an output, which is in the time domain, to a corresponding one of fast Fourier Transform (FFT) circuits 146-0 to 146-8 (collectively referred to as "FFTs 146"). In one example, the output includes 256 symbols or another number of symbols. Each of FFTs 146 converts the received symbols to the frequency domain using or based on, for example, a fast Fourier transform. Each of FFTs 146 may provide the frequency domain data to bins and switches blocks 161-0 to 161-8. As discussed in greater detail below, bins and switches blocks 161 include, for example, memories or registers, also referred to as frequency bins (FB) or points, that store frequency components associated with each subcarrier SC and the tone signal.

The bins and switches blocks 161 may be configured to supply the outputs of FFTs 146, i.e., frequency domain data FD, to corresponding frequency bins FB. Further processing of the contents of frequency bins FB by replicator components 147 and other circuits in the TX DSP 100 result in drive signals supplied to modulators 116, whereby, based on such drive signals, optical subcarriers are generated that correspond to the frequency bin groupings associated with that subcarrier and the tone signal.

In the example discussed above, the bins and switches blocks 161 supply frequency domain data FD0-0 to FD-n from FFT 146-0 to a respective one of frequency bins FB0-0 to FB0-*n* for further processing, as described in greater detail below.

Each of replicator components or circuits 147-0 to 147-8 may replicate the contents of the frequency bins FB and store such contents (e.g., for T/2 based filtering of the subcarrier or tone signal) in a respective one of the plurality of replicator components. Such replication may increase the sample rate. In addition, replicator components or circuits 147-0 to 147-8 may arrange or align the contents of the frequency bins to fall within the bandwidths associated with pulse shaped filter circuits 148-0 to 148-19 described below.

Each pulse shape filter circuit 148-0 to 148-8 may apply a pulse shaping filter to the data stored in the 512 frequency bins of a respective one of the plurality of replicator components or circuits 147-0 to 147-8 to thereby provide a respective one of a plurality of filtered outputs, which are multiplexed and subject to an inverse FFT, as described below. Pulse shape filter circuits 148-1 to 148-8 calculate the transitions between the symbols and the desired subcarrier spectrum so that the subcarriers can be packed together spectrally for transmission, e.g., with a close frequency separation. Pulse shape filter circuits 148-0 to 148-8 also may be used to introduce timing skew between the subcarriers to correct for timing skew induced by links between nodes shown in FIG. 1, for example. Multiplexer component 149, which may include a multiplexer circuit or memory, may receive the filtered outputs from pulse shape filter circuits 148-0 to 148-8, and multiplex or combine such outputs together to form an element vector. In one embodiment, at least one of the pulse shape filter circuits 148-0 to 148-8 may introduce a timing skew to separate the tone signal from the subcarriers such that the tone signal is separated from, and thus less likely to interfere with, the subcarriers.

Next, IFFT circuit or component 150-1 may receive the element vector and provide a corresponding time domain signal or data based on an inverse fast Fourier transform (IFFT). In one example, the time domain signal may have a rate of 64 GSample/s. Take last buffer or memory circuit 151-1, for example, may select the last 1024 samples, or another number of samples, from an output of IFFT component or circuit 150-1 and supply the samples to DACs 108-1 and 108-2 (see FIG. 2) at 64 GSample/s, for example. As noted above, DAC 108-1 is associated with the in-phase (I) component of the X pol signal, and DAC 108-2 is associated with the quadrature (Q) component of the Y pol signal. Accordingly, consistent with the complex representation XI+jXQ, DAC 108-1 receives values associated with XI and DAC 108-2 receives values associated with jXQ. As indicated by FIG. 2, based on these inputs, DACs 108-1 and 108-2 provide analog outputs to MZMD 112-1 and MZMD 112-2, respectively, as discussed above.

As further shown in FIG. 3, each of bits-to-symbol circuits 144-0 to 144-8 outputs a corresponding one of symbols indicative of data carried by the Y polarization component of the polarization multiplexed modulated optical signal output on fiber 22. As further noted above, these symbols may have the complex representation YI+j*YQ. Each such symbol may be processed by a respective one of overlap and save buffers 155-0 to 155-8, a respective one of FFT circuits 156-0 to 156-8, a respective one of replicator components or circuits 157-0 to 157-8, pulse shape filter circuits 158-0 to 158-8, multiplexer or memory 189, IFFT 150-2, and take last buffer or memory circuit 151-2, to provide processed symbols having the representation YI+j*YQ in a manner similar to or the same as that discussed above in generating processed symbols XI+j*XQ output from take last circuit 151-1. In addition, symbol components YI and YQ are provided to DACs 108-3 and 108-4 (FIG. 2), respectively. Based on these inputs, DACs 108-3 and 108-4 provide analog outputs to MZMD 112-3 and MZMD 112-4, respectively, as discussed above.

While FIG. 3 shows the TX DSP 100 as including a particular number and arrangement of functional components, in some implementations, the TX DSP 100 may include additional functional components, fewer functional components, different functional components, or differently arranged functional components. In addition, typically the number of overlap and save buffers, FFTs, replicator circuits, and pulse shape filters associated with the X component may be equal to the number of switch outputs, and the number of such circuits associated with the Y component may also be equal to the number of switch outputs. However, in other examples, the number of switch outputs may be different from the number of these circuits.

As noted above, based on the outputs of MZMDs 112-1 to 112-4, a plurality of optical subcarriers SC0 to SC7 may be output onto optical fiber 22 (FIG. 2), which is coupled to the primary node 14.

Consistent with an aspect of the present disclosure, the number of subcarriers transmitted from the primary node 14 to the secondary node 30 may vary over time based, for example, on capacity requirements at the primary node 14 and the secondary node 30. For example, if less downstream capacity is required initially at one or more of the secondary nodes 30, transmitter module 46 in primary node 14 may be configured to output fewer optical subcarriers. On the other hand, if further capacity is required later, transmitter module 46 may provide more optical subcarriers.

In addition, if based on changing capacity requirements, a particular secondary node 30 needs to be adjusted, for example, the output capacity of such secondary node 30 may be increased or decreased by, in a corresponding manner, increasing or decreasing the number of optical subcarriers output from the secondary node.

As noted above, by storing and subsequently processing zeros (0s) or other predetermined values in frequency bin FB groupings associated with a given subcarrier SC, that subcarrier may be removed or eliminated. To add or reinstate such subcarrier, frequency domain data output from the FFTs 146 may be stored in frequency bins FB and subsequently processed to provide the corresponding subcarrier. Thus, subcarriers may be selectively added or removed from the optical outputs of primary node 14 transmitter module 46 and secondary node 30 transmitter module, such that the number of subcarriers output from such transmitters 30 may be varied, as desired.

In the above example, zeros (0s) or other predetermined values are stored in selected frequency bins FBs to prevent transmission of a particular subcarrier SC. Such zeroes or values may, instead, be provided, for example, in a manner similar to that described above, at the outputs of corresponding replicator components 147 or stored in corresponding locations in memory or multiplexer 149. Alternatively, the zeroes or values noted above may be provided, for example, in a manner similar to that described above, at corresponding outputs of pulse shape filters 148.

In a further example, a corresponding one of pulse shape filters 148-1 to 148-8 may selectively generate zeroes or predetermined values that, when further processed, also cause one or more subcarriers SC to be omitted from the output of either primary node transmitter module 46 or secondary node transmitter. In particular, pulse shape filters 148-0 to 148-8 may include groups of multiplier circuits M. Multiplier circuit M constitutes part of a corresponding butterfly filter. In addition, each multiplier circuit grouping is associated with a corresponding one of subcarriers SC.

Each multiplier circuit M receives a corresponding one of output groupings RD from replicator components 147. In order to remove or eliminate one of subcarriers SC, multiplier circuits M receiving the outputs within a particular grouping associated with that subcarrier multiply such outputs by zero (0), such that each multiplier M within that group generates a product equal to zero (0). The zero products then are subject to further processing similar to that described above to provide drive signals to modulators 112 that result in a corresponding subcarrier SC being omitted from the output of the transmitter module 46.

On the other hand, in order to provide a subcarrier SC, each of the multiplier circuits M within a particular groping may multiply a corresponding one of replicator outputs RD by a respective one of coefficients C, which results in at least some non-zero products being output. Based on the products output from the corresponding multiplier grouping, drive signals are provided to modulators 112 to output the desired subcarrier SC from the transmitter module 46.

Accordingly, for example, in order to block or eliminate subcarrier SC0, each of multiplier circuits M (associated with subcarrier SC0) multiplies a respective one of replicator outputs RD by zero (0). Each such multiplier circuit, therefore, provides a product equal to zero, which is further processed, as noted above, such that resulting drive signals cause modulators 112 to provide an optical output without SC0. In order to reinstate SC0, multiplier circuits M multiply a corresponding one of appropriate coefficients C by a respective one of replicator outputs RD to provide products, at least some of which are non-zero. Based on these products, as noted above, modulator drive signals are generated that result in subcarrier SC0 being output.

The above examples are described in connection with generating or removing the X component of a subcarrier SC. The processes and circuitry described above is employed or included in the TX DSP 100 and optical circuitry used to generate the Y component of the subcarrier to be blocked. For example, switches and bins circuit blocks 162-0 to 162-8, have a similar structure and operate in a similar manner as switches and bins circuit blocks 161 described above to provide zeroes or frequency domain data as the case may be to selectively block the Y component of one or more subcarriers SC. Alternatively, multiplier circuits, like those described above may be provided to supply zero products output from selected pulse shape filters 158 in order to block the Y component of a particular subcarrier or, if non-zero coefficients are provided to the multiplier circuits instead, generate the subcarrier.

Thus, the above examples illustrate mechanisms by which subcarriers SC may be selectively blocked from or added to the output of the transmitter module 46. Since, as discussed below, DSPs and optical circuitry provided in the secondary node 30 transmitter module are similar to that of primary node 14 transmitter module 46, the processes and circuitry described above is provided, for example, in the secondary node transmitter module to selectively add and remove subcarriers SC from the outputs of the secondary node transmitter modules.

As described above in more detail, the transmitter module 46 may thus include a tone signal outside the bandwidth of the subcarriers into the optical signal transmitted from the primary node 14. The tone signal, therefore, has an initial frequency, initial power, and initial polarization that is known at the time the optical signal is transmitted. Additionally, the tone signal may be associated with an initial time at which the tone signal is first transmitted. In some embodiments, the tone signal is not modulated with any data.

In one embodiment, the tone signal is modulated. In some embodiments, the modulated tone signal may include data, for example, tone signal initial properties such as the initial frequency, initial power, and initial polarization (e.g., initial state of polarization) known at the time the optical signal is transmitted. In this way, in some embodiments, the secondary node 30 may receive information regarding the primary node 14.

Optical signals including optical subcarriers SC0 to SC7 and a tone signal reflection may be provided from the secondary node 30 to the primary node 14 in FIG. 1. An example of receiver module 50 in the primary node 14 will be described below with reference to FIG. 7.

Figure 4:
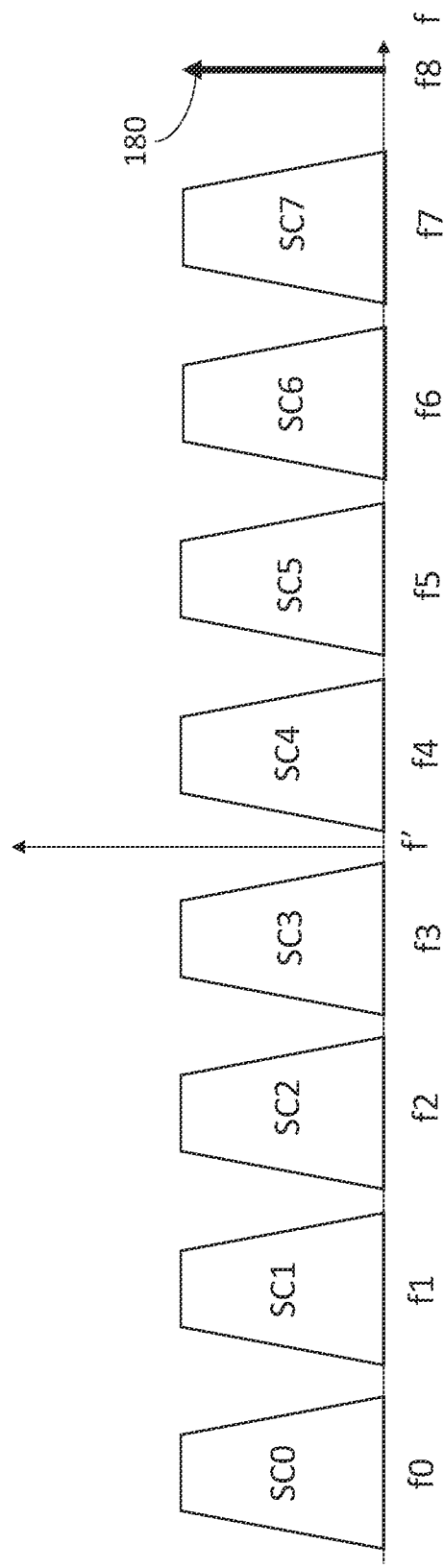
FIG. 4 is an example of a spectral plot showing optical subcarriers in accordance with the present disclosure.

Referring now to FIG. 4, shown therein is a diagram of an exemplary embodiment of a plurality of subcarriers, SC0 to SC7 that may be output by the transmitter module 46 of a transceiver 18 consistent with an aspect of the present disclosure. Each of subcarriers SC0 to SC7 may have a corresponding one of a plurality of frequencies f0 to f7. In addition, each of subcarriers SC0 to SC7 may be a Nyquist subcarrier. A Nyquist subcarrier is a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier SC may have an optical spectral bandwidth that is at least equal to the Nyquist frequency, as determined by the baud rate of such subcarrier.

As discussed in greater detail above, optical subcarriers SC0 to SC7 are generated by modulating light output from a laser. The frequency of such laser output light is f and is typically a center frequency such that half the subcarrier subcarriers, e.g., f4 to f7, are above f and half the subcarrier frequencies, e.g., f0 to f3, are below f.

Further shown in FIG. 4 is the tone signal 180. The tone signal 180 may be generated, for example by one or more of the TX DSP 100 sending a signal to the DAC 108 to cause the MZMD 112 to generate a signal corresponding to the tine signal 180 to be generated by the MZM 116. In one embodiment, the tone signal 180 is generated at a tone frequency f8 outside the carrier bandwidth between f0-f7 as shown in FIG. 4. It should be noted that while the tone signal 180 is shown at a frequency greater than the carrier bandwidth, e.g., greater than f7, in other embodiments, the tone signal 180 could be generated such that the tone signal 180 is at a tone frequency f8 outside the carrier bandwidth but less than the frequency for SC0 at f0. The tone signal, as shown in FIG. 4, has an initial frequency, initial power, and initial polarization that is known at the time the optical signal is transmitted.

In one embodiment, the tone frequency f8 of the tone signal 180 is generated at a frequency more than 500 MHz outside the carrier bandwidth, e.g., at a frequency at least 500 MHz greater than f7 or at least 500 MHz less than f0.

In one embodiment, the tone signal 180 is one or more of a pulsed signal (e.g., a signal transmitted periodically in predetermined intervals), a static signal (e.g., a signal that is continuously transmitted or inserted into the optical signal), or a per pol signal (e.g., a signal consisting of only one polarization). In one embodiment, the tone signal 180 is frequency hopping. When the tone signal 180 is pulsed, the tone signal 180 may be included with the optical signal at a first instant of time and at a second instant of time such that the tone signal 180 pulsed at the second instant of time does not interfere with the tone signal 180 pulsed at the first instant of time.

In one embodiment, the tone signal 180 has a pulse width selected based on a desired spatial resolution. In some embodiments, the tone signal 180 has a bandwidth of 1 GHz.

In one embodiment, the tone signal 180 has a tone frequency f8 between two subcarriers, such as between SC0 and SC1, for example, such that the tone frequency f8 may be intermediate f0 and f1, but outside the subcarriers SC0 and SC1. Similarly, the tone signal 180 may have a tone frequency f8 between any two, adjacent subcarriers. In this way. The tone signal 180 may be included into the optical signal without interfering with data carried on the subcarriers SC0-SC7.

In one embodiment, more than one tone signal 180 may be included in the optical signal. For example, a first tone signal may be included between f0 and f1 while a second tone signal may be included at f8. In one embodiment, a tone signal 180 may be included at a tone frequency less than f0, greater than f7, and between each subcarrier.

Referring now to FIGS. 5A-5D in combination, shown therein is the optical communication system 10 of FIG. 1 at different instants of time 200 depicting one or more of a tone signal 204, a tone signal location 208, a tone reflection 212, a tone reflection location 216, and a time-series graph 220 of the tone reflection 212.

Figure 5A:
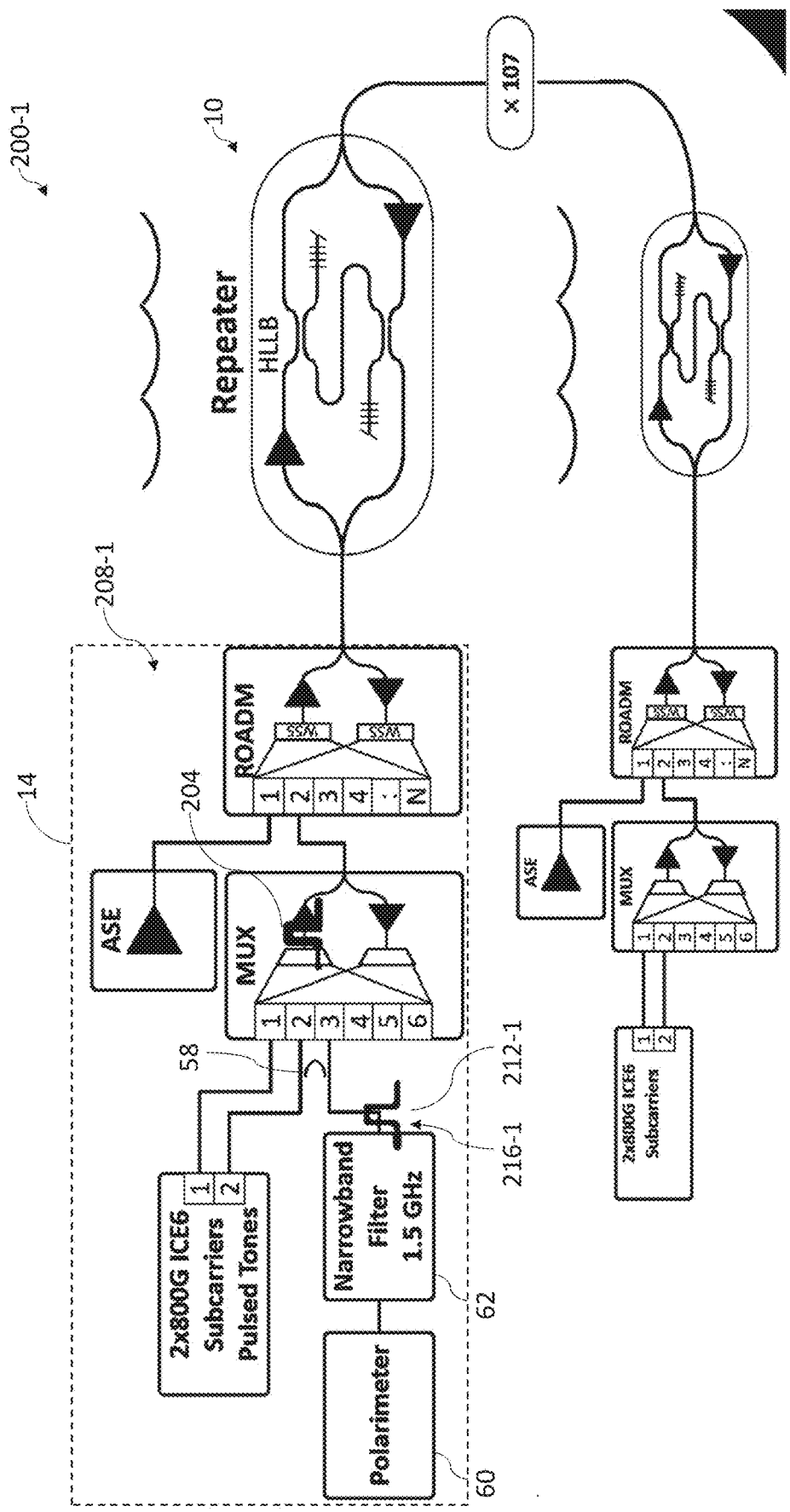
FIGS. 5A-5D depict an exemplary embodiment of a location of a tone signal within the optical network of FIG. 1 at varying instants in time.

Referring now to FIG. 5A, shown therein is the optical communication system 10 of FIG. 1 at a first instant of time 200-1. As shown, at the first instant of time 200-1, the tone signal 204 has a tone signal location 208-1 of the primary node 14. The tone signal 204 has already passed through the optical loopback 58 resulting in a first tone reflection 212-1 traveling towards the polarimeter 60 and with a tone reflection location 216-1 between the optical loopback 58 and the narrowband filter 62. The first tone reflection 212-1 passes through the narrowband filter 62 and is received by the polarimeter 60. In response to receive the first tone reflection 212-1, the polarimeter 60 stores data indicate of an initial timing within the time-series graph 220.

Figure 5B:
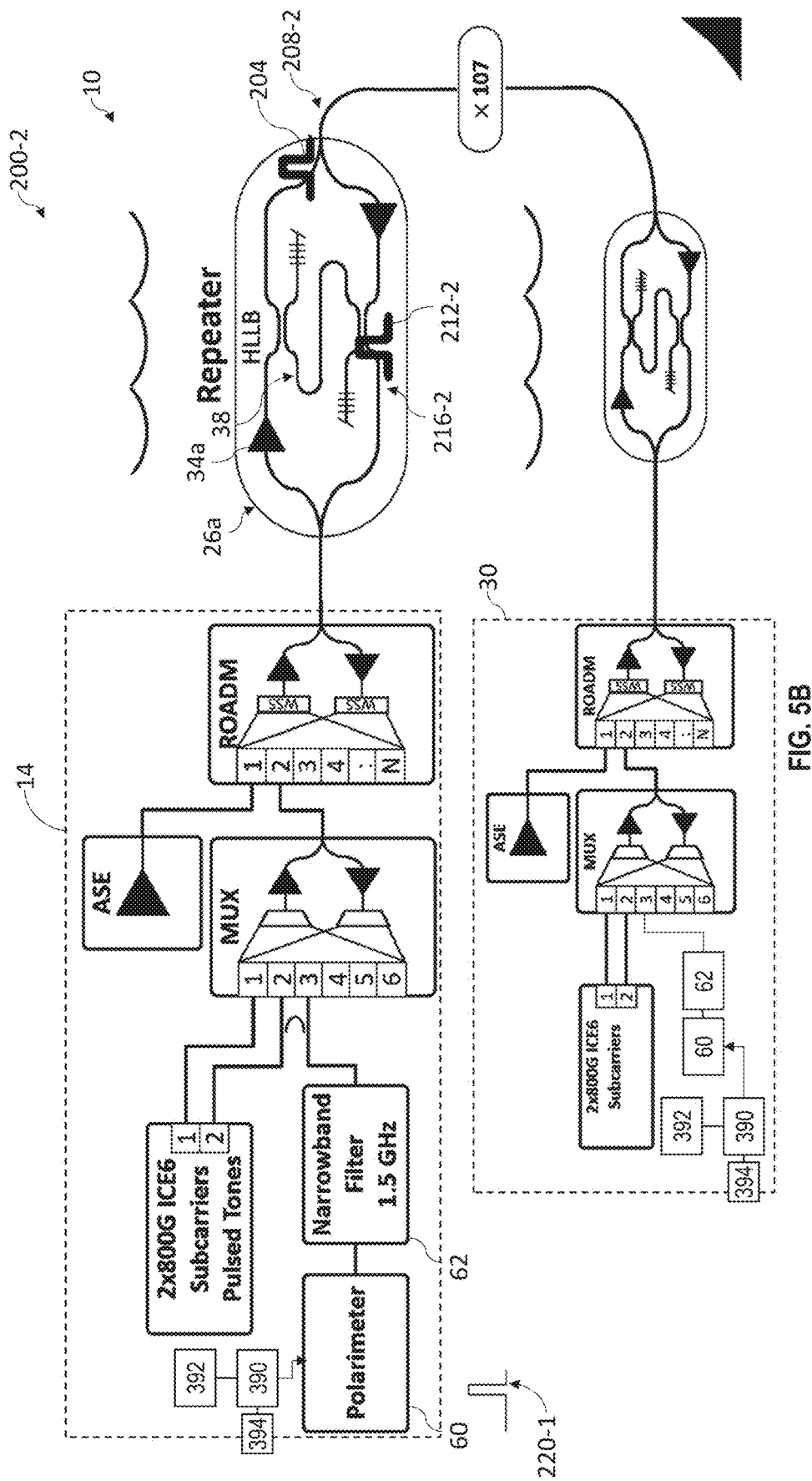

Referring now to FIG. 5B, shown therein is the optical communication system 10 of FIG. 1 at a second instant of time 200-2. As shown, at the second instant of time 200-2, the tone signal 204 has a tone signal location 208-2 exiting the in-line node 26a. At this second instant of time 200-2, the tone signal 204 has already passed the high loss loopback 38 resulting in a second tone reflection 212-2. At the second instant of time 200-2, the first tone reflection 212-1 has already passed through the narrowband filter 62 and the polarimeter 60 where the polarimeter has determined a first polarization of the first tone reflection 212-1 as shown in time-series graph 220-1.

In one embodiment, the primary node 14 further includes a processor 390 in communication with the polarimeter 60 and a memory 392. The memory 392 is a non-transitory, computer readable memory which may store computer executable instructions and/or a database. In one embodiment, the processor 390 is in communication with and may receive from the polarimeter 60 an indication of the polarization of the first tone reflection 212-1. In one embodiment, the memory 392 stores computer executable instructions that when executed by the processor, causes the processor to communicate and/or exchange data with one or more of the polarimeter 60, the transmitter module 46, and/or the receiver module 50 and to further implement the functions described below in more detail.

In one embodiment, the processor 390, in communication with the polarimeter 60, determines the polarization of the first tone reflection 212-1, and stores the determined polarization in the memory 392. In some embodiments, the determined polarization may be stored in a database or other computer readable structure in the memory 392, whereas in other embodiments, the determined polarization may be stored in a data buffer or, in some embodiments, sent via a network element (e.g., network element 394) to another processor or computer. The processor 390, the memory 392 and/or the network element 394 may be referred to collectively as a polarization circuit.

In one embodiment, the processor 390 stores the determined polarization with one or more additional tone reflection information. The one or more tone reflection information may include, for example, a timestamp indicative of a time at which the polarimeter 60 received the first tone reflection 212-1, a time-delta indicative of a difference in time between a time at which the polarimeter 60 received the first tone reflection 212-1 from the optical loopback 58 (i.e., for the first tone reflection 212-1, the time-delta would be 0) and/or a time at which the polarimeter 60 received the first tone reflection 212-1.

In some embodiments, the secondary node 30 further includes the narrowband filter 62, the polarimeter 60, the processor 390, the memory 392, and/or, optionally, the network element 394, each of which is similar to and operates in accordance with the same components described in relation to the primary node 14. In some embodiments, the processor 390 in the primary node 14 may be in communication with the processor 390 in the secondary node 30 to jointly process the determined polarization and/or one or more additional tone reflection information in optical signals in both the upstream and the downstream directions. In this way, a precision and/or quality of the determined polarization and/or the one or more additional tone reflection information may be improved to better locate environmental disturbances on the optical communication system 10.

Figure 5C:
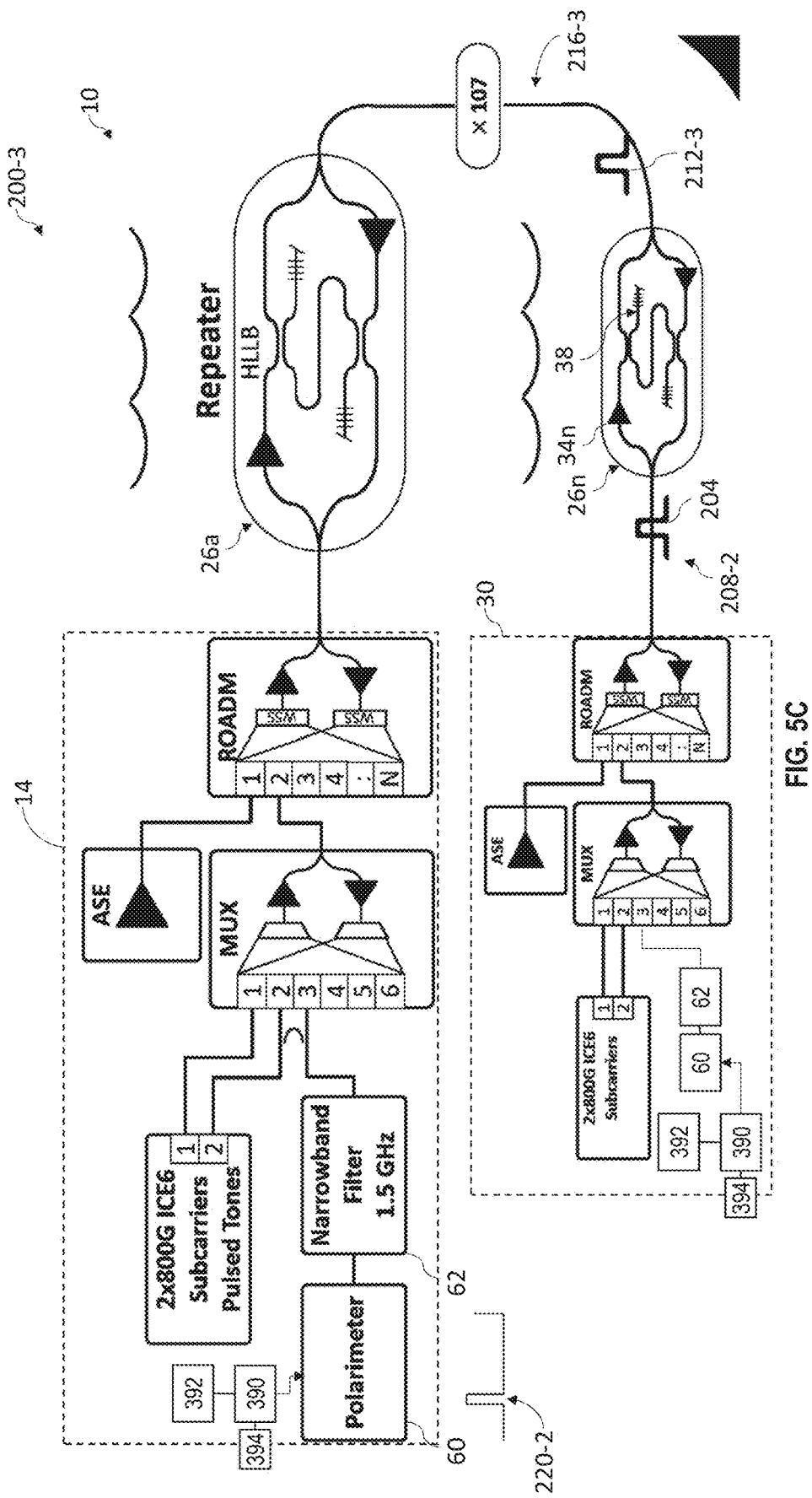

Referring now to FIG. 5C, shown therein is the optical communication system 10 of FIG. 1 at a third instant of time 200-3. As shown, at the third instant of time 200-3, the tone signal 204 has a tone signal location 208-3 of exiting the in-line node 26n. At this third instant of time 200-3, the tone signal 204 has already passed the high loss loopback 38 of the in-line node 26n, resulting in a third tone reflection 212-3 heading upstream towards the primary node 14. At the third instant of time 200-3, the first tone reflection 212-1 and the second tone reflection 212-2 have already passed through the narrowband filter 62 and the polarimeter 60 where the polarimeter has determined a second polarization of the second tone reflection 212-2 as shown in time-series graph 220-2.

In one embodiment, the processor 390 is in communication with and may receive from the polarimeter 60 an indication of the polarization of the second tone reflection 212-2. The processor 390, in communication with the polarimeter 60, determines the polarization of the second tone reflection 212-2 and stores the polarization in the memory 392 as described above in more detail.

In one embodiment, the processor 390 stores the polarization with one or more additional tone reflection information. The one or more tone reflection information may include, for example, a timestamp indicative of a time at which the polarimeter 60 received the second tone reflection 212-2 and/or a time-delta indicative of a difference in time between a time at which the polarimeter 60 received the first tone reflection 212-1 and the second tone reflection 212-2.

In one embodiment, the processor 390 may store the polarization with the one or more additional tone reflection information for the second tone reflection 212-2 wherein the one or more additional tone reflection information may include a distance and/or a particular optical fiber link 22 determined as described below in relation to FIG. 6.

In one embodiment, the processor 390, having received the polarization for the first tone reflection 212-1 and the second tone reflection 212-2, may determine a state of polarization (SOP) variation of the optical fiber link 22-1 and/or the optical fiber link 22-2. The SOP variation, $S^{n\prime}$, may be determined by finding a difference in the SOP between the primary node 14 loopback 58 and the in-line node 26a, i.e., with the formula $$S^{n\prime} = \left(\frac{S_1^n}{S_0^n} * \frac{S_2^n}{S_0^n} * \frac{S_3^n}{S_0^n}\right) - \left(\frac{S_1^{n-1}}{S_0^{n-1}} * \frac{S_2^{n-1}}{S_0^{n-1}} * \frac{S_3^{n-1}}{S_0^{n-1}}\right),$$

where $S_0$, $S_1$, $S_2$, and $S_3$ are the elements of the Stokes vector and n is an ordinal for the tone reflection 212, e.g., for the first tone reflection 212-1, n=1, for the second tone reflection 212-2, n=2, etc.

Figure 5D:
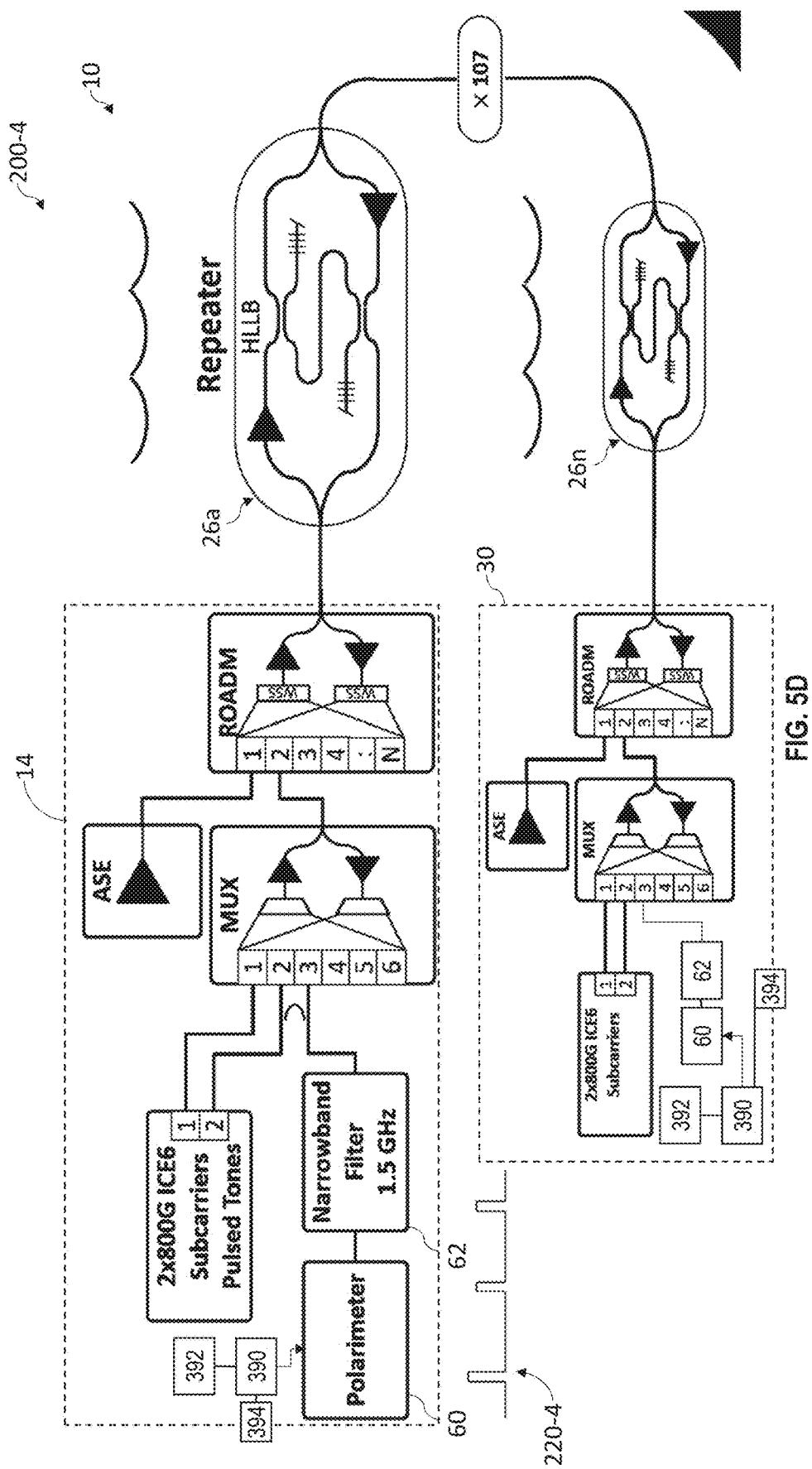

Referring now to FIG. 5D, shown therein is the optical communication system 10 of FIG. 1 at a fourth instant of time 200-4. As shown, at the fourth instant of time 200-4, the tone signal 204 has been received by the secondary node 30. At the fourth instant of time 200-4, the third tone reflection 212-3 has passed through the narrowband filter 62 and the polarimeter 60 where the polarimeter has determined a third polarization of the third tone reflection 212-3 as shown in time-series graph 220-3.

In one embodiment, the processor 390 is in communication with and may receive from the polarimeter 60 an indication of the polarization of the third tone reflection 212-3. The processor 390, in communication with the polarimeter 60, determines the polarization of the third tone reflection 212-3 and stores the polarization in the memory 392 as described above in more detail.

In one embodiment, the processor 390 stores the polarization with one or more additional tone reflection information. The one or more tone reflection information may include, for example, a timestamp indicative of a time at which the polarimeter 60 received the third tone reflection 212-3 and/or a time-delta indicative of a difference in time between a time at which the polarimeter 60 received the first tone reflection 212-1 or the second tone reflection 212-2 and the time at which the polarimeter 60 received the third tone reflection 212-3. In other words, the time-delta may be either a time difference between the first tone reflection 212-1 and any other tone reflection 212 or may be a time difference between a particular tone reflection 212 and a subsequent tone reflection 212. In each of the above cases, the processor 390 can determine a time traveled by each tone reflection 212 to determine a particular distance traveled by each tone reflection 212 as described below in reference to FIG. 6.

In one embodiment, the processor 390 may store the polarization with the one or more additional tone reflection information for the third tone reflection 212-3 wherein the one or more additional tone reflection information may include a distance and/or a particular optical fiber link 22 determined as described below in relation to FIG. 6.

In one embodiment, the processor 390 stores the polarization with the one or more additional tone reflection information for each tone reflection 212 received for a particular tone signal 204 sent. For example, the processor 390 stores the polarization with the one or more additional tone reflection information for the first tone reflection 212-1 caused by the optical loopback 58 and for each tone reflection 212 caused by each in-line node 26a-n between the primary node 14 and the secondary node 30.

In one embodiment, the processor 390 stores the SOP variation with the one or more additional tone reflection information for each tone reflection 212 received for a particular tone signal 204 sent. In one embodiment, the processor 390 may store the SOP variation, a timestamp (or any other indication of a time, such as a time delta), a first loopback location and a second loopback location. For example, from the SOP variation example above in reference to FIG. 5C, the processor 390 may store the SOP variation $S^{2'}$, as the SOP variation and an indication that the SOP variation is specific for the SOP variation between the primary node 14 and the in-line node 26a along optical fiber link 22-1 and optical fiber link 22-2. In one embodiment, the indication that the SOP variation is specific for the SOP variation the primary node 14 and the in-line node 26a may include an indication of the optical fiber links 22 between the primary node 14 and the in-line node 26a, i.e., the optical fiber links 22-1 and 22-2, or the indication may include an identifier of a location of the optical loopback resulting in the tone reflections 212-1 and 212-2, e.g., an identifier of the primary node 14 and the in-line node 26a.

In one embodiment, the processor 390 is further in communication with the transmitter module 46 and, once the processor 390 has stored the polarization with the one or more additional tone reflection information for a last tone reflection 212, e.g., the third tone reflection 212-3 shown in FIGS. 5A-D, the processor 390 sends a signal to the transmitter module 46 to cause the transmitter module 46 to send a second tone signal.

In one embodiment, the second tone signal is sent from the transmitter module 46 before the last tone reflection 212 is received by the primary node 14. In one embodiment, a second tone signal is sent from the transmitter module 46 before the first tone reflection 212 is received by the primary node 14.

It should be understood that while only three tone reflections 212 are described in relation to FIGS. 5A-D, the number of tone reflections in the optical communication system 10 may be at least equal to one plus the number on in-line nodes 26a-n between the primary node 14 and the secondary node 30.

Additionally, while FIGS. 5A-D illustrates only one tone reflection 212 in the optical communication system 10 at each instant of time 200 for simplicity, any number of tone reflections 212 may be present in the optical communication system 10 at each instant of time 200. In one embodiment, the number of tone reflections 212 present in the optical communication system 10 at any instant of time 200 may be dependent on a number of in-line nodes 26 present in the optical communication system 10 and a distance of each optical fiber link 22 between each in-line node 26.

As shown in reference to FIGS. 5A-D, in this way, the primary node 14 can receive each tone reflection 212 caused by the tone signal 204 being reflected upstream at each in-line node 26a-n by the high loss loopback 38.

Figure 6:
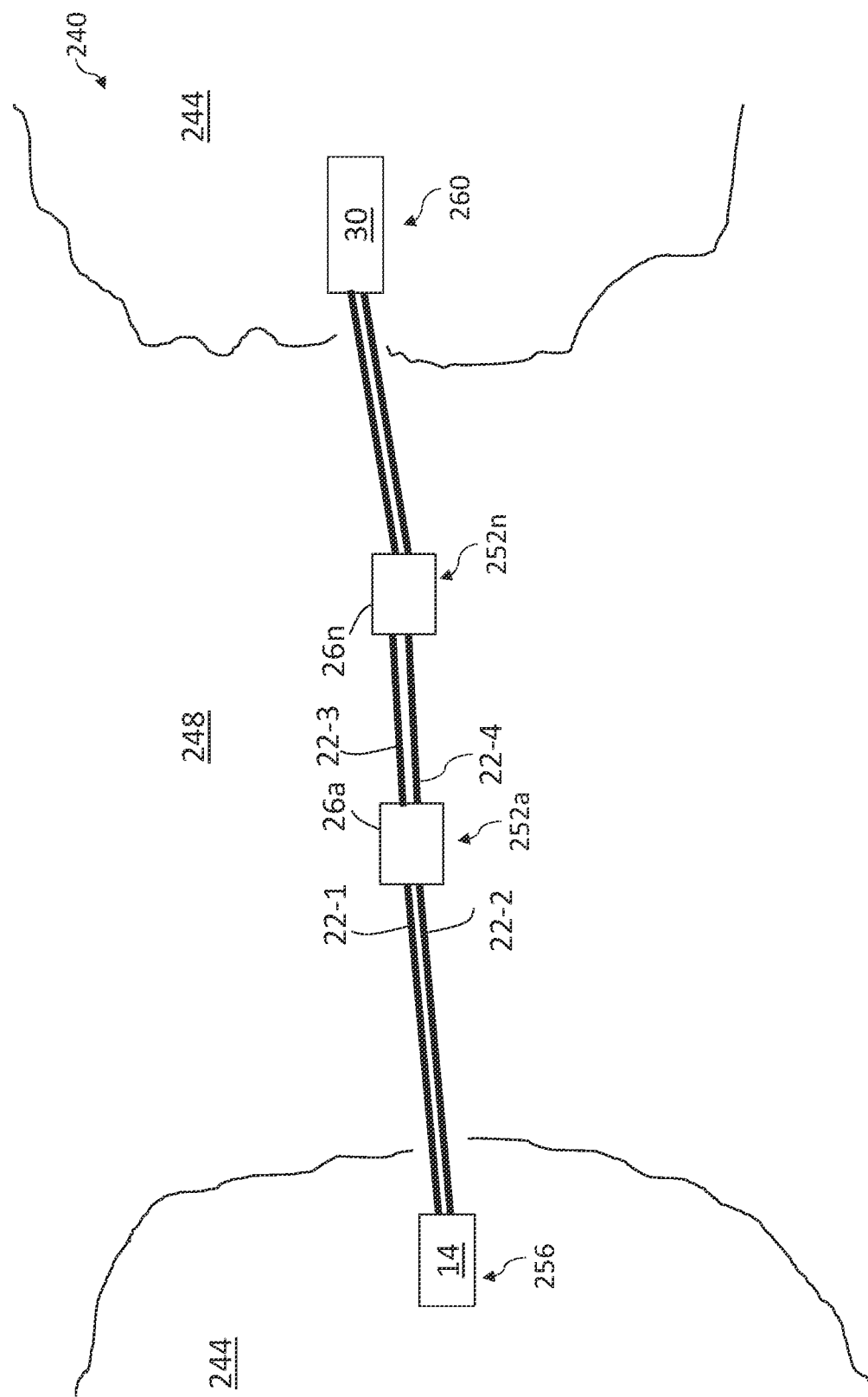
FIG. 6 is a diagram of an exemplary embodiment of a subsea optical communication system aspect of the optical communication system of FIG. 1 including one or more optical amplifier at a known geographic location.

Referring now to FIG. 6, shown therein is a diagram of an exemplary embodiment of a subsea optical communication system 240 constructed in accordance with the present disclosure. The subsea optical communication system 240 may be constructed similar to the optical communication system 10 of FIG. 1. The subsea optical communication system 240 illustrates the primary node 14 and the secondary node 30 being on land 244 while the inline nodes 26, shown as the inline node 26a and the inline node 26n, are illustrated as being submerged under water 248. Each inline node 26a-n is shown to have a known geographic location 252, e.g., a known location 252a and a known location 252n.

The known geographic location can be expressed in latitude/longitude. Moreover, each node, e.g., the primary node 14 and the secondary node 30 have a known location 256 and a known location 260, respectively. Therefore, each optical fiber link 22 has a known length.

Therefore, when a tone signal 200 is transmitted downstream from the primary node 14 towards the secondary node 30, thus generating the tone reflection at the primary node 14 and each of the inline nodes 26, the primary node 14 can measure a duration between each instant of time 200 to determine a distance traveled for each tone reflection 212. In this way, any change in polarization between the initial polarization of the tone signal and the polarization of each tone reflection can be correlated to a particular distance travelled and thus, to a particular optical fiber link 22 over which the polarization changed.

Figure 7:
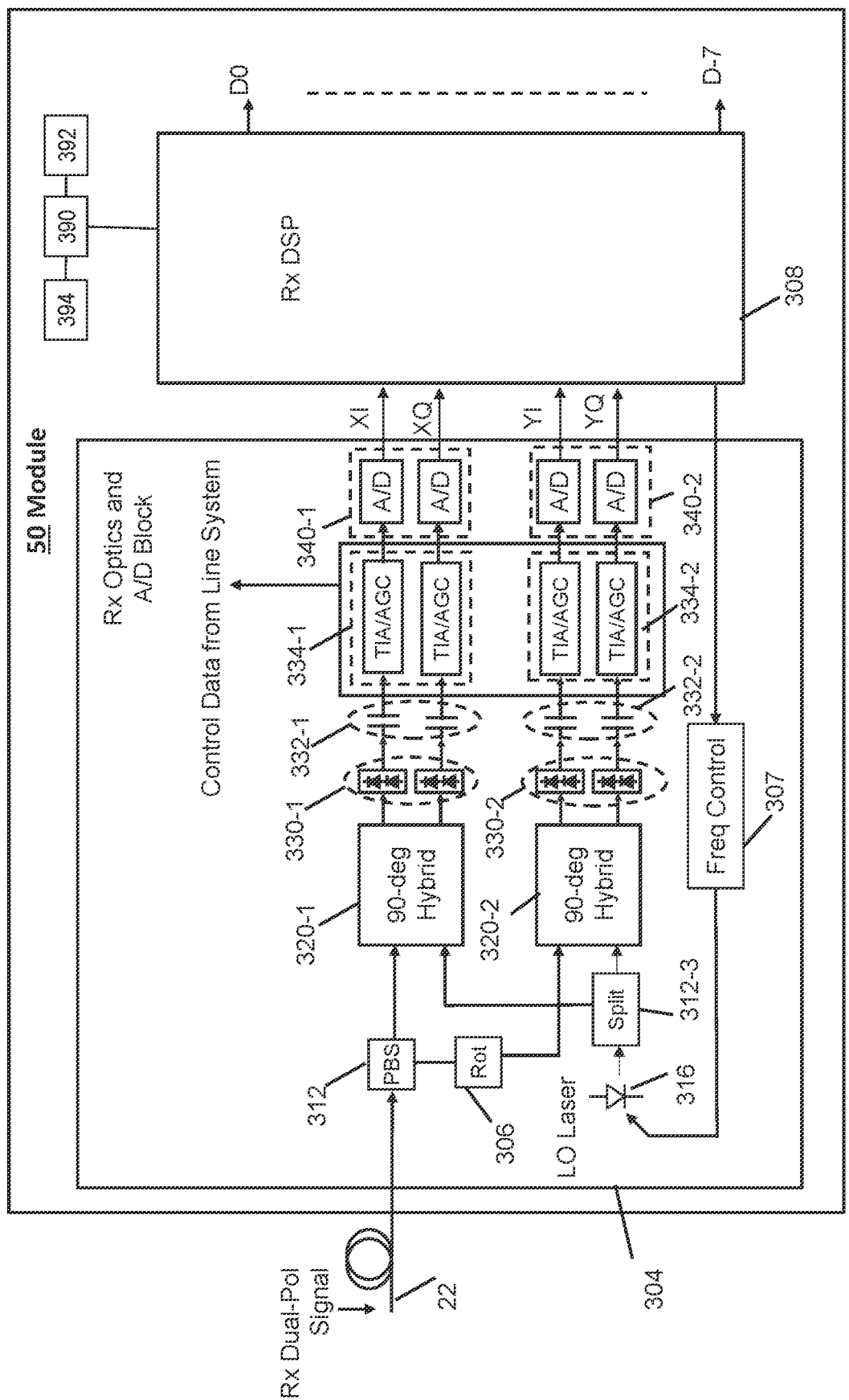
FIG. 7 is a diagram showing an exemplary embodiment of a secondary node receiver constructed in accordance with the present disclosure.

Referring now to FIG. 7, shown therein is an optical receiver module 50 including an Rx optics and A/D block 304, which, in conjunction with an Rx DSP 308, may carry out coherent detection. Rx optics and A/D block 304 may include a polarization splitter (PBS) 312 with first and second outputs), a local oscillator (LO) laser 316, 90 degree optical hybrids or mixers 320-1 and 320-2 (referred to generally as hybrid mixers 320 and individually as hybrid mixer 320), detectors 330-1 and 330-2 (referred to generally as detectors 330 and individually as detector 330, each including either a single photodiode or balanced photodiode), AC coupling capacitors 332-1 and 332-2, transimpedance amplifiers/automatic gain control circuits TIA/AGC 334-1 and 334-2, ADCs 340-1 and 340-2 (referred to generally as ADCs 340 and individually as ADC 340).

Polarization beam splitter (PBS) 312 may include a polarization splitter that receives an input polarization multiplexed optical signal including optical subcarriers SC0 to SC7 and the tone signal supplied by optical fiber link 22, which may be, for example. PBS 312 may split the incoming optical signal into the two X and Y orthogonal polarization components. The Y component may be supplied to a polarization rotator 306 that rotates the polarization of the Y component to have the X polarization. Hybrid mixers 320 may combine the X and rotated Y polarization components with light from local oscillator laser 310, which, in one example, is a tunable laser. For example, hybrid mixer 320-1 may combine a first polarization signal (e.g., the component of the incoming optical signal having a first or X (TE) polarization output from a first PBS port with light from local oscillator 310, and hybrid mixer 320-2 may combine the rotated polarization signal (e.g., the component of the incoming optical signal having a second or Y (TM) polarization output from a second PBS port) with the light from local oscillator 310. In one example, polarization rotator 306 may be provided at the PBS output to rotate Y component polarization to have the X polarization.

Detectors 330 may detect mixing products output from the optical hybrids, to form corresponding voltage signals, which are subject to AC coupling by capacitors 332-1 and 332-1, as well as amplification and gain control by TIA/AGCs 334-1 and 334-2. The outputs of TIA/AGCs 334-1 and 334-2 and ADCs 340 may convert the voltage signals to digital samples. For example, two detectors (e.g., photodiodes) 330-1 may detect the X polarization signals to form the corresponding voltage signals, and a corresponding two ADCs 340-1 may convert the voltage signals to digital samples for the first polarization signals after amplification, gain control and AC coupling. Similarly, two detectors 330-2 may detect the rotated Y polarization signals to form the corresponding voltage signals, and a corresponding two ADCs 340-2 may convert the voltage signals to digital samples for the second polarization signals after amplification, gain control and AC coupling. RX DSP 308 may process the digital samples associated with the X and Y polarization components to output data associated with one or more subcarriers within a group of subcarriers SC0 to SC7 encompassed by the bandwidth associated with the secondary node housing the particular DSP 308.

While FIG. 7 shows optical receiver module 50 as including a particular number and arrangement of components, in some implementations, the receiver module 50 may include additional components, fewer components, different components, or differently arranged components. The number of detectors 330 and/or ADCs 340 may be selected to implement the receiver module 50 that is capable of receiving a polarization multiplexed signal. In some instances, one of the components illustrated in FIG. 7 may carry out a function described herein as being carry out by another one of the components illustrated in FIG. 8.

Figure 8:
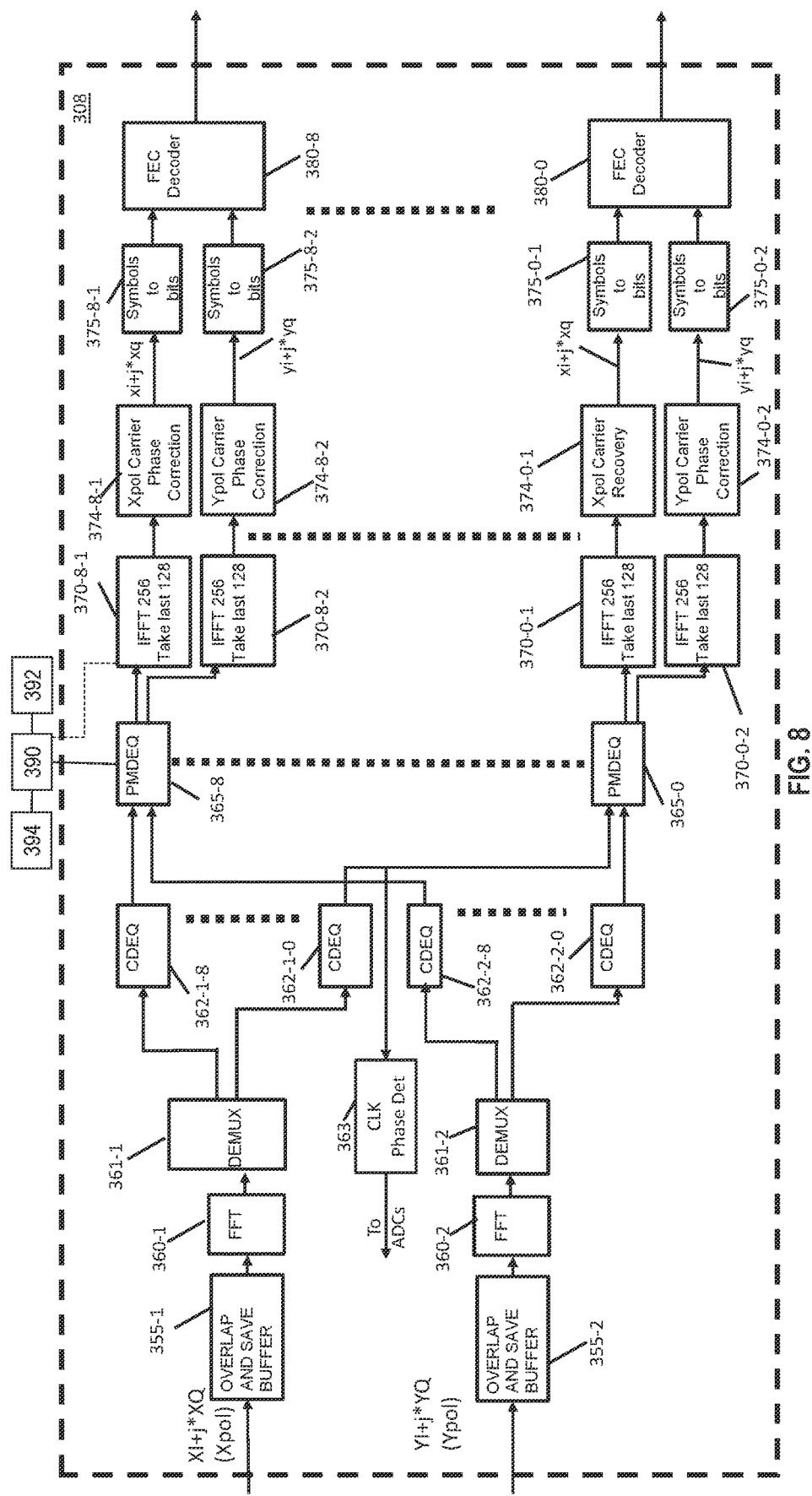
FIG. 8 is a diagram showing an exemplary embodiment of a secondary node receiver DSP consistent with the present disclosure.

Referring now to FIG. 8, shown therein is an exemplary Rx DSP 308 constructed in accordance with the present disclosure. As noted above, analog-to-digital (A/D) circuits 340-1 and 340-2 (FIG. 7) output digital samples corresponding to the analog inputs supplied thereto. In one example, the samples may be supplied by each A/D circuit at a rate of 64 GSamples/s. The digital samples correspond to symbols carried by the X polarization of the optical subcarriers and may be represented by the complex number XI+jXQ. The digital samples may be provided to overlap and save buffer 355-1, as shown in FIG. 8. FFT component or circuit 360-1 may receive the 2048 vector elements, for example, from the overlap and save buffer 355-1 and convert the vector elements to the frequency domain using, for example, a fast Fourier transform (FFT). The FFT component 360-1 may convert the 2048 vector elements to 2048 frequency components, each of which may be stored in a register or "bin" or other memory, as a result of carrying out the FFT.

The frequency components then may be demultiplexed by demultiplexer 361-1, and groups of such components may be supplied to a respective one of chromatic dispersion equalizer circuits CDEQ 362-1-0 to 362-1-8, each of which may include a finite impulse response (FIR) filter that corrects, offsets or reduces the effects of, or errors associated with, chromatic dispersion of the transmitted optical subcarriers. Each of CDEQ circuits 362-1-0 to 362-1-8 supplies an output to a corresponding polarization mode dispersion (PMD) equalizer circuit 365-0 to 365-8 (which individually or collectively may be referred to as 365).

Digital samples output from A/D circuits 340-2 associated with Y polarization components of subcarrier SC1 may be processed in a similar manner to that of digital samples output from A/D circuits 340-1 and associated with the X polarization component of each subcarrier. Namely, overlap and save buffer 355-2, FFT 360-2, demultiplexer 361-2, and CDEQ circuits 362-2-0 to 362-2-8 may have a similar structure and operate in a similar fashion as buffer 355-1, FFT 360-1, demultiplexer 361-1, and CDEQ circuits 362-1-0 to 362-1-8, respectively. For example, each of CDEQ circuits 362-2-0 to 362-8 may include an FIR filter that corrects, offsets, or reduces the effects of, or errors associated with, chromatic dispersion of the transmitted optical subcarriers. In addition, each of CDEQ circuits 362-2-0 to 362-2-8 provide an output to a corresponding one of PMDEQ 365-0 to 365-8.

As further shown in FIG. 8, the output of one of the CDEQ circuits, such as CDEQ 362-1-0 may be supplied to clock phase detector circuit 363 to determine a clock phase or clock timing associated with the received subcarriers. Such phase or timing information or data may be supplied to ADCs 340-1 and 340-2 to adjust or control the timing of the digital samples output from ADCs 340-1 and 340-2. In one embodiment, phase or timing information or data may be supplied to a particular ADC 340 to adjust or control the timing of a digital sample output from the particular ADC 340 corresponding to the tone signal. In this way, the tone signal 204 may have a timing or phase that is different from subcarriers SC0-SC7 and may be analyzed independently of the subcarriers SC0-SC7.

Each of PMDEQ circuits 365 may include another FIR filter that corrects, offsets or reduces the effects of, or errors associated with, PMD of the transmitted optical subcarriers. Each of PMDEQ circuits 365 may supply a first output to a respective one of IFFT components or circuits 370-0-1 to 370-8-1 and a second output to a respective one of IFFT components or circuits 370-0-2 to 370-8-2, each of which may convert a 256-element vector, in this example, back to the time domain as 256 samples in accordance with, for example, an inverse fast Fourier transform (IFFT).

In one embodiment, the Rx DSP 308 includes a PMDEQ 365 to determine the effects of, or errors associated with, the PMD of the transmitted tone signal. For example, the Rx DSP 308 may include the PMDEQ 365-8 for use to determine the PDM of the transmitted tone signal.

In one embodiment, as shown in FIG. 8, the receiver module 50 further includes a processor 390 in communication with at least one component of the Rx DSP 308 and a memory 392. The memory 392 is a non-transitory, computer readable memory which may store computer executable instructions and/or a database. In one embodiment, the processor 390 is in communication with one or more particular PMDEQ 365 associated with the tone signal and may receive from the particular PMDEQ 365 an indication the effects of or errors associated with PMD of the tone signal within the transmitted optical signal. The indication of the effects of or errors associated with the PMD of the tone signal may then be used to determine a polarization of the tone signal received by the receiver module 50. It should be noted that, as used herein, references to the tone signal received by the receiver module include the tone reflection (s) or tone signal reflection(s) received by the receiver module. Generally, in the primary node 14, the tone signal received by the receiver module 50 is the tone signal reflection or the tone reflection.

In one embodiment, the processor 390, in communication with the PMDEQ 365, determines the polarization of the tone signal and stores the determined polarization in the memory 392. In some embodiments, the determined polarization may be stored in a database or other computer readable structure in the memory 392, whereas in other embodiments, the determined polarization may be stored in a data buffer or, in some embodiments, sent via a network element (e.g., network element 394) to another processor or computer.

In one embodiment, the processor 390 stores the determined polarization with one or more additional tone reflection information. The one or more tone reflection information may include, for example, a timestamp indicative of a time at which the receiver module 50 received the tone signal, a time-delta indicative of a difference in time between the initial time at which the receiver module 50 received the tone signal from the optical loopback 58 and a time at which the receiver module 50 received the tone reflection.

In one embodiment, the processor 390 stores the determined polarization with the one or more additional tone reflection information for each tone reflection received for a particular tone signal sent. For example, the processor 390 stores the determined polarization with the one or more additional tone reflection information for the tone reflection caused by the optical loopback 58 and for each tone reflection caused by each in-line node 26*a-n* between the primary node 14 and the secondary node 30.

In one embodiment, the processor 390 is further in communication with the transmitter module 46 and, once the processor 390 has stored the determined polarization with the one or more additional tone reflection information for a last tone reflection, e.g., the tone reflection for the in-line node 26*n*, send a signal to the transmitter module 46 to cause the transmitter module 46 to send a second tone signal.

In one embodiment, the processor 390 may store the determined polarization with the one or more additional tone reflection information for each tone reflection wherein the one or more additional tone reflection information may include a distance and/or a particular optical fiber link 22 determined as described above in relation to FIG. 6.

Time domain signals or data output from IFFT 370-0-1 to 370-8-1 are supplied to a corresponding one of Xpol carrier phase correction circuits 374-1-1 to 374-8-1, which may apply carrier recovery techniques to compensate for X polarization transmitter (e.g., laser 120) and receiver (e.g., local oscillator laser 316) linewidths. In some implementations, each carrier phase correction circuit 374-0-1 to 374-8-1 may compensate or correct for frequency and/or phase differences between the X polarization of the transmit signal and the X polarization of light from the local oscillator 316 based on an output of Xpol carrier recovery circuit 374-0-1, which performs carrier recovery in connection with one of the subcarrier based on the outputs of IFFT 370-01. After such X polarization carrier phase correction, the data associated with the X polarization component may be represented as symbols having the complex representation $xi+j*xq$ in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 365 may be updated based on the output of at least one of carrier phase correction circuits 374-0-01 to 374-8-01.

In a similar manner, time domain signals or data output from IFFT 370-0-2 to 370-8-2 are supplied to a corresponding one of Ypol carrier phase correction circuits 374-0-2 to 374-8-2, which may compensate or correct for Y polarization transmitter (e.g., laser 120) and receiver (e.g., local oscillator laser 316) linewidths. In some implementations, each carrier phase correction circuit 374-0-2 to 374-8-2 also may correct or compensate for frequency and/or phase differences between the Y polarization of the transmit signal and the Y polarization of light from the local oscillator 316. After such Y polarization carrier phase correction, the data associated with the Y polarization component may be represented as symbols having the complex representation $yi+j*yq$ in a constellation, such as a QPSK constellation or a constellation associated with another modulation formation, such as an m-quadrature amplitude modulation (QAM), m being an integer. In some implementations, the output of one of circuits 374-0-2 to 374-8-2 may be used to update the taps of the FIR filter included in one or more of PMDEQ circuits 365 instead of, or in addition to, the output of at least one of the carrier recovery circuits 374-0-1 to 374-8-1.

In one embodiment, the processor 390 is in communication with one or more particular IFFT 370-*n*-1 corresponding to an X polarization of the tone signal and with one or more particular IFFT 370-*n*-2 corresponding to a Y polarization of the tone signal received by the receiver module 50. The processor 390, in communication with each particular IFFT 370, may receive the X polarization phase correction and the Y polarization phase correction for the tone reflection. In one embodiment, the processor 390 processes the X polarization phase correction and the Y polarization phase correction for the tone reflection similar to the determined polarization as described above. For example, the processor 390 may store the X polarization phase correction and the Y polarization phase correction for the tone reflection in the memory 392, e.g., along with the one or more additional tone reflection information, such as the timestamp and/or time-delta.

In one embodiment, the processor 390, in communication with one or more particular IFFT 370-*n*-1 corresponding to an X polarization of the tone signal and with one or more particular IFFT 370-*n*-2 corresponding to a Y polarization of the tone signal received by the receiver module 50 or in communication with the PMDEQ 365 determines a SOP variation based on the polarization detected and/or the X polarization phase correction and the Y polarization phase correction for the tone reflection. The processor 390 may then store the SOP variation with one or more additional tone reflection information for each tone reflection received for a particular tone signal sent. In one embodiment, the processor 390 may store the SOP variation, a timestamp (or any other indication of a time, such as a time delta), a first loopback location and a second loopback location for each tone reflection received. In one embodiment, the SOP variation is correlated to a particular optical fiber link 22 or set of optical fiber links 22 between the primary node 14 and the secondary node 30 through which each tone reflection has passed through.

As further shown in FIG. 8, the output of carrier recovery circuits, e.g., carrier recovery circuit 374-0-1, also may be supplied to carrier phase correction circuits 374-1-1 to 374-8-1 and 374-0-2 to 374-8-2, whereby the phase correction circuits may determine or calculate a corrected carrier phase associated with each of the received subcarriers based on one of the recovered carriers, instead of providing multiple carrier recovery circuits, each of which is associated with a corresponding subcarrier. The equalizer, carrier recovery, and clock recovery may be further enhanced by utilizing the known (training) bits that may be included in control signals CNT, for example by providing an absolute phase reference between the transmitted and local oscillator lasers.

Each of the symbols-to-bits circuits or components 375-0-1 to 375-8-1 may receive the symbols output from a corresponding one of circuits 374-0-1 to 374-8-1 and map the symbols back to bits. For example, each of the symbol-to-bits components 375-0-1 to 375-8-1 may map one X polarization symbol, in a QPSK or m-QAM constellation, to Z bits, where Z is an integer. For dual-polarization QPSK modulated subcarriers, Z is four. Bits output from each of component 375-0-1 to 375-8-1 are provided to a corresponding one of FEC decoder circuits 380-0 to 380-8.

Y polarization symbols are output form a respective one of circuits 374-0-2 to 374-8-2, each of which has the complex representation $yi+j*yq$ associated with data carried by the Y polarization component. Each Y polarization, like the X polarization symbols noted above, may be provided to a corresponding one of bit-to-symbol circuits or components 375-0-2 to 375-8-2, each of which has a similar structure and operates in a similar manner as symbols-to-bits component 375-0-1 to 375-8-1. Each of circuits 375-0-2 to 375-8-2 may provide an output to a corresponding one of FEC decoder circuits 380-0 to 380-8.

In another example, Data associated with a subcarrier SC received, but not intended for output from that receiver, can be blocked by inserting zeroes (0s) in chromatic dispersion equalizer (CDEQ) circuits 362 associated with both the X and Y polarization components of each subcarrier. In particular, multiplier circuits (provided in corresponding butterfly filter circuits), like multiplier circuits M described above, may selectively multiply the inputs to the CDEQ circuit 362 by either zero or a desired coefficient. As multiplication by a zero generates a zero product, such zero products are further processed by corresponding circuitry in Rx DSP 308, e.g., corresponding IFFTs 370, carrier phase correction components 374, symbol-to-bits components 375, and FEC decoder 380, a corresponding output of DSP 308 will also be zero.

While FIG. 8 shows the Rx DSP 308 as including a particular number and arrangement of functional components, in some implementations, the Rx DSP 308 may include additional functional components, fewer functional components, different functional components, or differently arranged functional components.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

Figure 9:
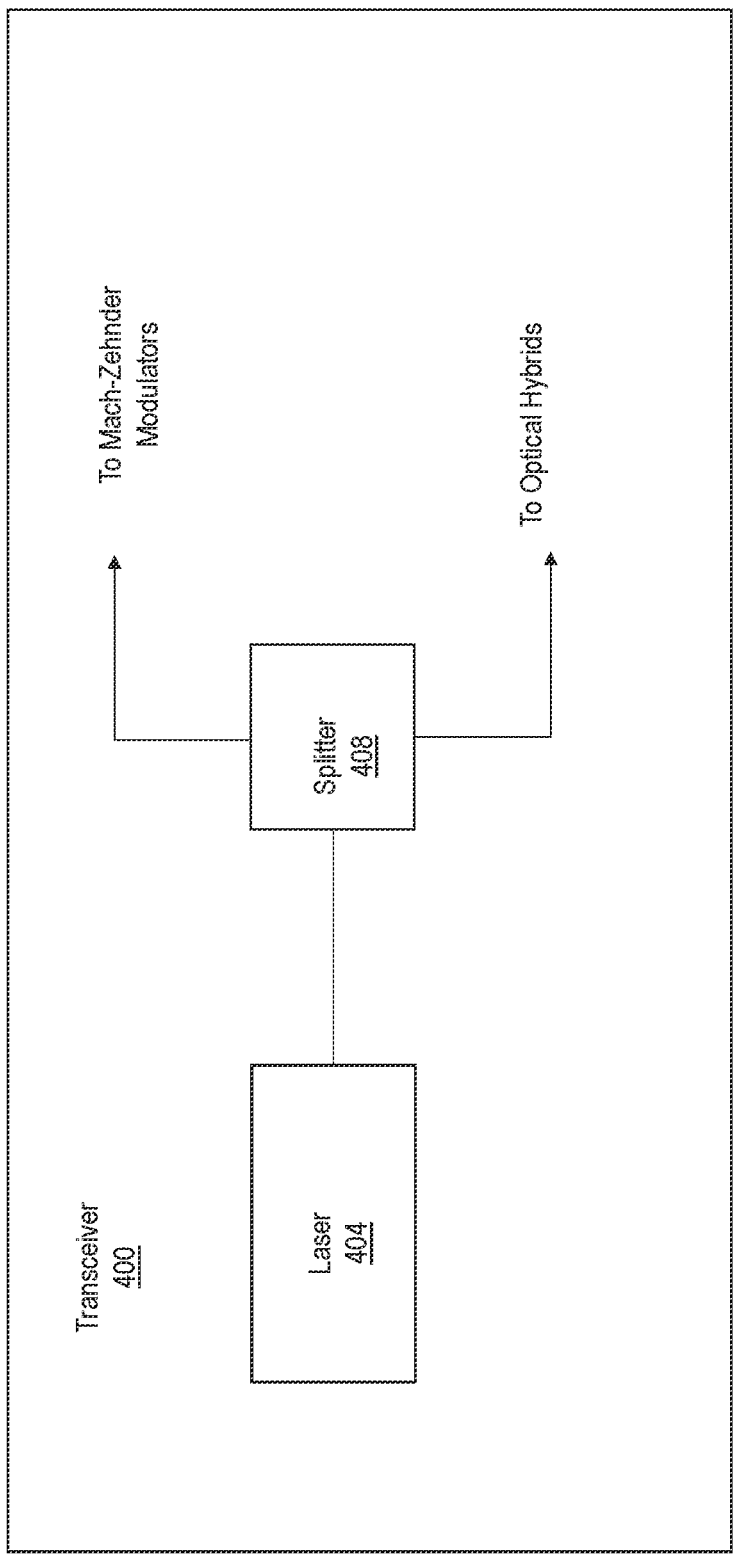
FIG. 9 is a diagram of an exemplary embodiment of a transceiver having a shared laser.

Various modifications and other embodiments will be apparent to those skilled in the art from consideration of the present specification, and the detailed implementations described above are provided as examples. For example, the digital signal process disclosed above may be implemented as a programmable gate array circuit (PGA), or a field programmable gate array circuit (FPGA). In addition, although separate lasers 120 and 316 are provided in the transmitter module and receiver module, respectively, as noted above, a transceiver consistent with the present disclosure may include a common laser that is "shared" between the transmitter and receiver. For example, FIG. 9 is a diagram illustrating an example of the transceiver 400 using a shared laser 404 providing optical signals both for transmission and reception (as a local oscillator signal) in accordance with one or more implementations of the present disclosure. As shown, the laser 404 generates an optical signal and provides the optical signal to the splitter 408. The splitter 408 splits the optical signal into two portions. One portion is provided to the optical hybrids or mixers 320-1 and 320-2, while the other portion is provided to modulators 116-1 to 116-4.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

Accordingly, other implementations are within the scope of the claims.

What is claimed is:

1. A transceiver, comprising:
   an optical source having a laser providing a continuous wave optical signal;
   a modulator receiving the continuous wave optical signal, the modulator configured to encode data into the continuous wave optical signal;
   a transmitter module having circuitry to receive data to be encoded into the continuous wave optical signal, the transmitter module having at least one drive circuit supplying driver signals to the modulator to cause the modulator to encode data into a carrier having a frequency band and a tone signal outside of the frequency band into the continuous wave optical signal, the continuous wave optical signal having an optical power and a polarization;
   a narrowband filter operable to receive a portion of the continuous wave optical signal having the encoded data and a first tone reflection of the tone signal at a first instant of time and to pass the first tone reflection of the continuous wave optical signal at the first instant of time;
   a polarimeter operable to receive the first tone reflection and determine a first tone polarization of the first tone reflection; and
   an optical loopback component operable to direct the portion of the continuous wave optical signal to the narrowband filter.

2. The transceiver of claim 1, further comprising:
   a receiver module operable to receive a second continuous wave optical signal having a second encoded data and a second tone reflection at a second instant of time, the receiver module having at least one optical splitter to direct a first portion of the second continuous wave optical signal to a demodulator configured to decode the second encoded data of the second continuous wave optical signal into a second data and to direct a second portion of the second continuous wave optical signal to the narrowband filter;
   the narrowband filter operable to receive the second portion of the second continuous wave optical signal and to pass the second tone reflection of the second continuous wave optical signal at the second instant of time; and
   a polarimeter operable to receive the second tone reflection and determine a second tone polarization of the second tone reflection at the second instant of time.

3. The transceiver of claim 2, further comprising:
   a polarization circuit having a processor and a non-transitory computer readable medium storing computer executable instructions that when executed by the processor causes the processor to:
   receive the first tone polarization from the polarimeter at the first instant in time;
   receive the second tone polarization from the polarimeter at the second instant in time; and
   store the first tone polarization and the second tone polarization in the memory.

4. The transceiver of claim 3, wherein the processor further stores a timestamp with the first tone polarization and the second tone polarization in the memory.

5. The transceiver of claim 4, wherein the timestamp is indicative of a time corresponding to the first instant in time at which the polarimeter received the tone bandwidth.

6. The transceiver of claim 4, wherein the timestamp is indicative of a time-delta between the first instant in time and the second instant in time.

7. The transceiver of claim 3, wherein the non-transitory computer readable medium further stores computer executable instructions that when executed by the processor further causes the processor to:
   generate a tone reflection information indicative of the tone polarization over a period of time between the first instant in time and the second instant in time.

8. The transceiver of claim 3, wherein the non-transitory computer readable medium further stores computer executable instructions that when executed by the processor further causes the processor to:
   generate a tone reflection information indicative of a change in the tone polarization based on the first tone polarization at the first instant in time and the second tone polarization at the second instant in time stored in the memory.

9. The transceiver of claim 3, wherein the non-transitory computer readable medium further stores computer executable instructions that when executed by the processor further causes the processor to:
   determine a state of polarization variation for the second tone reflection received by calculating a different in a state of polarization of the first tone reflection at the first instant of time and a state of polarization of the second tone reflection at the second instant of time.

10. The transceiver of claim 9, wherein the non-transitory computer readable medium further stores computer executable instructions that when executed by the processor further causes the processor to:
    associate the second tone reflection with a particular one or more optical fiber link; and
    store the state of polarization variation for the second tone reflection and the associated particular one or more optical fiber link in the memory.

* * * * *